(12) United States Patent
Wu et al.

(10) Patent No.: US 12,438,825 B2
(45) Date of Patent: Oct. 7, 2025

(54) PARAMETERIZED QUALITY OF SERVICE IN A NETWORK

(71) Applicant: Entropic Communications, LLC, New York, NY (US)

(72) Inventors: Zong Liang Wu, San Diego, CA (US); Ronald Lee, San Diego, CA (US); Anton Monk, San Diego, CA (US)

(73) Assignee: Entropic Communications, LLC, Plano, TX (US)

( * ) Notice: Subject to any disclaimer, the term of this patent is extended or adjusted under 35 U.S.C. 154(b) by 0 days.

(21) Appl. No.: 17/727,930

(22) Filed: Apr. 25, 2022

(65) Prior Publication Data

US 2022/0247693 A1 Aug. 4, 2022

Related U.S. Application Data

(63) Continuation of application No. 16/681,244, filed on Nov. 12, 2019, now abandoned, which is a (Continued)

(51) Int. Cl.
*H04L 47/724* (2022.01)
*H04L 47/10* (2022.01)
(Continued)

(52) U.S. Cl.
CPC ............ *H04L 47/724* (2013.01); *H04L 47/15* (2013.01); *H04L 47/762* (2013.01);
(Continued)

(58) Field of Classification Search
CPC ..... H04L 47/724; H04L 47/15; H04L 47/762; H04L 47/788; H04L 47/801;
(Continued)

(56) References Cited

U.S. PATENT DOCUMENTS

| 3,742,454 A | 6/1973 | Baker, Jr. |
| 4,092,820 A | 6/1978 | Kume et al. |

(Continued)

FOREIGN PATENT DOCUMENTS

| CN | 1356012 A | 6/2002 |
| CN | 520659 A | 8/2004 |

(Continued)

OTHER PUBLICATIONS

Int'l Search Report Appln No. PCT/US2008/053202 mailed Dec. 15, 2008.

(Continued)

*Primary Examiner* — Christopher M Crutchfield
*Assistant Examiner* — Tito Q Pham
(74) *Attorney, Agent, or Firm* — Arch & Lake LLP

(57) ABSTRACT

A method for managing data transmission comprising making a bandwidth on a network resource available to at least one requestor for transmitting or receiving data according to a first request of a first type, the first request have a prescribed quality of service guarantee; transmitting first data in accordance with the first type to or from the at least one requestor on the network resource using a first portion of the bandwidth, if the first data are available to be transferred to or from the at least one requestor; transmitting second data according to a second request of a second type on the network resource to or from the at least one requestor or a second requestor, the second data transmitted without a quality of service guarantee using a second portion of the bandwidth, if the first portion of the prescribed bandwidth is less than the entire bandwidth.

21 Claims, 14 Drawing Sheets

Related U.S. Application Data continuation of application No. 15/275,180, filed on Sep. 23, 2016, now abandoned, which is a continuation of application No. 12/031,496, filed on Feb. 14, 2008, now abandoned.

(60) Provisional application No. 60/931,314, filed on May 21, 2007, provisional application No. 60/927,613, filed on May 4, 2007, provisional application No. 60/927,636, filed on May 4, 2007, provisional application No. 60/927,766, filed on May 4, 2007, provisional application No. 60/901,564, filed on Feb. 14, 2007, provisional application No. 60/901,563, filed on Feb. 14, 2007.

(51) Int. Cl.
*H04L 47/70* (2022.01)
*H04L 47/762* (2022.01)
*H04L 47/78* (2022.01)
*H04L 47/80* (2022.01)

(52) U.S. Cl.
CPC .......... *H04L 47/788* (2013.01); *H04L 47/801* (2013.01); *H04L 47/805* (2013.01); *H04L 47/806* (2013.01); *H04L 47/822* (2013.01); *H04L 47/824* (2013.01); *H04L 47/826* (2013.01)

(58) Field of Classification Search
CPC ... H04L 47/805; H04L 47/806; H04L 47/822; H04L 47/824; H04L 47/826
See application file for complete search history.

(56) References Cited

U.S. PATENT DOCUMENTS

| | | | |
|---|---|---|---|
| 4,605,950 A | 8/1986 | Goldberg et al. | |
| 4,675,732 A | 6/1987 | Oleson | |
| 4,720,688 A | 1/1988 | Hasegawa et al. | |
| 4,887,052 A | 12/1989 | Murakami et al. | |
| 5,073,930 A | 12/1991 | Green | |
| 5,276,904 A | 1/1994 | Mutzig et al. | |
| 5,896,558 A | 4/1999 | Wiedeman | |
| 5,959,592 A | 9/1999 | Petruzzelli | |
| 6,005,515 A | 12/1999 | Allen et al. | |
| 6,424,817 B1 | 7/2002 | Hadden et al. | |
| 6,600,730 B1 | 7/2003 | Davis et al. | |
| 6,717,913 B1 | 4/2004 | Ghahremani et al. | |
| 6,763,223 B1 | 7/2004 | Hirabayashi et al. | |
| 6,823,170 B1 | 11/2004 | Dent | |
| 6,832,071 B1 | 12/2004 | Nakamura et al. | |
| 6,888,831 B1 | 5/2005 | Hospodor et al. | |
| 6,970,422 B1* | 11/2005 | Ho | H04W 72/1236 370/338 |
| 6,985,695 B1 | 1/2006 | Kato | |
| 6,993,306 B2 | 1/2006 | Buznitsky et al. | |
| 7,130,576 B1 | 10/2006 | Gurantz et al. | |
| 7,212,782 B2 | 5/2007 | Atarashi | |
| 7,542,715 B1 | 6/2009 | Gurantz et al. | |
| 7,586,376 B2 | 9/2009 | Litmanen | |
| 7,586,381 B2 | 9/2009 | Rohde et al. | |
| 7,605,670 B2 | 10/2009 | Rohde et al. | |
| 7,636,021 B2 | 12/2009 | Rohde et al. | |
| 7,756,092 B1* | 7/2010 | Ho | H04W 28/24 370/338 |
| 7,792,486 B2 | 9/2010 | Petruzzelli | |
| 8,009,725 B2 | 8/2011 | Petrovic et al. | |
| 8,086,170 B2 | 12/2011 | Petrovic et al. | |
| 8,300,681 B2 | 10/2012 | Petrovic et al. | |
| 8,892,026 B2 | 11/2014 | Petrovic et al. | |
| 9,219,557 B2 | 12/2015 | Bargroff et al. | |
| 9,413,476 B2 | 8/2016 | Petrovic et al. | |
| 9,853,757 B2 | 12/2017 | Petrovic et al. | |

| | | | |
|---|---|---|---|
| 2002/0029271 A1 | 3/2002 | Schwager | |
| 2002/0044553 A1 | 4/2002 | Chakravorty | |
| 2002/0063475 A1 | 5/2002 | Freeston et al. | |
| 2002/0080816 A1 | 6/2002 | Spinar et al. | |
| 2002/0159411 A1 | 10/2002 | Airy et al. | |
| 2003/0005130 A1 | 1/2003 | Cheng | |
| 2003/0035442 A1 | 2/2003 | Eng | |
| 2003/0067929 A1 | 4/2003 | Matsuzawa | |
| 2003/0072264 A1 | 4/2003 | Mo et al. | |
| 2003/0095562 A1 | 5/2003 | Liu et al. | |
| 2003/0199246 A1 | 10/2003 | Friedman et al. | |
| 2004/0029549 A1 | 2/2004 | Fikart | |
| 2004/0209584 A1 | 10/2004 | Bargroff | |
| 2004/0235415 A1 | 11/2004 | Atarashi | |
| 2004/0259497 A1 | 12/2004 | Dent | |
| 2005/0047335 A1 | 3/2005 | Cheng et al. | |
| 2005/0111462 A1* | 5/2005 | Walton | H04L 47/30 370/395.4 |
| 2005/0152370 A1 | 7/2005 | Meehan et al. | |
| 2005/0254503 A1 | 11/2005 | Claseman | |
| 2005/0276219 A1 | 12/2005 | Wang et al. | |
| 2006/0179305 A1* | 8/2006 | Zhang | H04L 63/068 713/168 |
| 2006/0187606 A1 | 8/2006 | Fallahi et al. | |
| 2006/0277578 A1 | 12/2006 | Goldblatt et al. | |
| 2006/0280197 A1 | 12/2006 | Stone | |
| 2007/0058646 A1 | 3/2007 | HermonI | |
| 2007/0121678 A1* | 5/2007 | Brooks | H04N 21/235 348/E7.07 |
| 2007/0129029 A1 | 6/2007 | Litmanen | |
| 2007/0130246 A1 | 6/2007 | Lau et al. | |
| 2007/0147409 A1* | 6/2007 | Kallio | H04N 21/23614 370/431 |
| 2007/0168486 A1 | 7/2007 | McCoy et al. | |
| 2008/0066096 A1* | 3/2008 | Wollmershauser | H04N 21/64322 725/35 |
| 2008/0083603 A1 | 4/2008 | Kushima | |
| 2008/0132193 A1 | 6/2008 | Petrovic et al. | |
| 2008/0181173 A1* | 7/2008 | Wei | H04L 47/24 370/329 |
| 2009/0190549 A1 | 7/2009 | Kim et al. | |
| 2009/0296668 A1 | 12/2009 | Capone et al. | |
| 2010/0002584 A1 | 1/2010 | Jalali | |

FOREIGN PATENT DOCUMENTS

| | | |
|---|---|---|
| EP | 0800314 A1 | 10/1997 |
| EP | 0971509 A1 | 1/2000 |
| EP | 1089469 A1 | 4/2001 |
| EP | 1225785 | 7/2002 |
| EP | 1601144 A | 2/2005 |
| EP | 1693980 A2 | 8/2006 |
| GB | 2406481 A | 3/2005 |
| JP | 2002359662 A | 12/2002 |
| JP | 2003204333 A | 7/2003 |
| JP | 2005065240 A | 3/2005 |
| WO | 0072626 A | 11/2001 |
| WO | 0182550 A | 11/2001 |
| WO | 0251015 A2 | 6/2002 |
| WO | 03003658 | 1/2003 |
| WO | 2005076544 A1 | 8/2005 |
| WO | 2005109703 A1 | 11/2005 |
| WO | 2006028138 A1 | 3/2006 |
| WO | 2006119397 A1 | 11/2006 |

OTHER PUBLICATIONS

Int'l Search Report Appln No. PCT/US2008/054006 mailed Feb. 3, 2009.

Seaman, M., et al., "Integrated Service Mappings on IEEE 802 Networks; draft-ietf-issll-isB02-svc-mapping-02.txt", August 199B, vol. issll, No. 2, XP015021742; ISSN: 0000-0004.

Selvakumar Set Al: "Differential priority-based adaptive rate service discipline for QoS guarantee of video stream", Computer Communications, Elsevier Science BV, Nov. 25, 1997, pp. 1160-1174, vol. 20, No. 13, City/Country Unknown.

(56) References Cited

OTHER PUBLICATIONS

Yavatkar, R. et al., "SBM (Subnet Bandwidth Manager: A Protocol for RSVP-based Admission Control over IEEE 802-style networks; rfc2B14.txt", May 2000, pp. 7-9, 31-33, XP015008597, ISSN: 0000-0003.
European Search Report for EP Appln. No. 08729901.2 dated Jun. 30, 2011.
Int'l Search Report and Written Opinion Appln No. PCT/US2007/089192 Oct. 8, 2008.
European Rule 71 Communication dated Nov. 10, 2016 for European Patent Application No. 08729205.8.
Ando,et al., QoS Technology for Home Networks, Consumer Communications and Networking Conference, Jan. 5-8, 2004, pp. 19-24.
Chinese Office Action dated Nov. 25, 2011 from related application No. 200880004836.1 and English translation.
Communication "First Office Action" issued Jun. 23, 2011 in counterpart CN Application No. 200880007820.6.
European Search Report Appln. No. 12152215.5, mailed Apr. 19, 2012.
European Search Report Appl No. 12152213.0 mailed May 16, 2012.
European Search Report Appln No. 12152218.9 mailed May 4, 2012.
Hwang, Won-Joo et al. "HomeMAC: OoS-based MAC Protocol for the Home Network", Proceedings of the Seventh International Symposium on Computers and Communications (ISCC '02).
IEEE "Layer management", Revision with Corrections, Clarifications & Enhancements, P802.11-REVma/D9.0 Oct. 2006, pp. 319-320.
Int'l Search Report and Written Opinion Appln No. PCT/US2008/053212 mailed Aug. 6, 2008.
Int'l Search Report and Written Opinion Appln No. PCT/US2008/053222 mailed Jul. 28, 2008.

\* cited by examiner

PARAMETERIZED QUALITY OF SERVICE IN A NETWORK

CLAIM OF PRIORITY

This application is a continuation of U.S. patent application Ser. No. 16/681,244, filed Nov. 12, 2019; which is a continuation of U.S. patent application Ser. No. 15/275,180, filed Sep. 23, 2016 (now abandoned); which is a continuation of U.S. Patent Application Ser. No. 12/031,496, filed Feb. 14, 2008 (now abandoned); which claims priority to U.S. Provisional Application 60/901,564 filed Feb. 14, 2007; U.S. Provisional Application 60/927,613 filed May 4, 2007; U.S. Provisional Application 60/901,563 filed Feb. 14, 2007; U.S. Provisional Application 60/927,766 filed May 4, 2007; U.S. Provisional Application 60/927,636 filed May 4, 2007; and U.S. Provisional Application 60/931,314 filed May 21, 2007. Each of the above-mentioned applications is hereby incorporated herein by reference in its entirety.

FIELD OF THE DISCLOSURE

The disclosed method and apparatus relates to a communication protocol in a network, and more specifically, relates to a quality of service protocol in a network.

BACKGROUND

In addition to computers, home networks now typically include multiple types of subscriber equipment configured to deliver subscriber services through the home network. The subscriber services include the delivering of multimedia, such as streaming audio and video, through the home network to the subscriber equipment where it is presented to a user. As the number of available subscriber services increases, so does the number of devices being connected to a home network. The increase in the number of services and devices increases the complexity of the coordination between the network nodes as each node may be produced by a different manufacturer at different times. Some home networking technologies have emerged in an attempt to facilitate simple home network solutions and take advantage of existing network infrastructure that may be present in a number of homes. For example, the Home Phone Network Alliance (HPNA) allows users to network home computers by using the existing telephone and coaxial cable wiring within a home. HPNA-enabled devices utilize a different frequency spectrum than the spectrum used by faxes and phones. Instead of using existing telephone and coaxial wiring, the Homeplug® Power Alliance utilizes the existing electrical power wiring in a home to create a home network. In a Homeplug® network, all Homeplug®-enabled devices that are plugged into a wall outlet connected to a common electrical circuit may be wired together in a home network. One issue with Homeplug® is that the network bandwidth is susceptible to significant reduction due to large variations of the home electrical wiring and reactive loads in the outlets.

Additionally, problems arise in implementing network devices that correctly interact with all other network devices. These problems may inhibit the deployment of newer devices that provide later-developed services in the presence of older (legacy) devices. The emerging Multimedia over Coax Alliance (MoCA) standard architecture impacts this problem in that (1) network behaviors dynamically assign a device, such as a node, the "Network Coordinator (NC) role" in order to optimize performance, (2) only the device in the NC role is known to be able to schedule traffic for all other nodes in the network and (3) form a full mesh network architecture between any device and its peers.

With many potential applications sharing the same digital network, various applications have to compete for the same limited bandwidth compounding the distribution problem, A bandwidth intensive application, such as a high-throughput download, may cause the degradation of other more important applications sharing the network. This outcome may be unacceptable when the other application requires a high quality of service.

Various solutions to solve this problem have been proposed, usually involving a high-level network controller or having high-level applications setting priority to data packets or data streams within the network. Moreover, intelligent network devices require high computational power, and are consequently more expensive than they need to be. Finally, complex network devices are impractical for home use, as most consumers do not have the sophistication or experience to configure a computer network.

SUMMARY OF THE DISCLOSURE

In one embodiment, a method for managing data transmission, comprises the steps of: (a) making a prescribed bandwidth on a network resource available to at least one requestor for transmitting or receiving data according to a first request of a first request type, the first request type have a prescribed quality of service guarantee; (b) transmitting first data in accordance with the first request to or from the at least one requestor on the network resource, such transmission using a first portion of the prescribed bandwidth, if the first data are available to be transferred to or from the at least one requestor; (c) transmitting second data according to a second request of a second request type on the network resource to or from the at least one requestor or a second requestor, the second data transmitted without a quality of service guarantee, the transmission using a second portion of the prescribed bandwidth, if the first portion of the prescribed bandwidth is less than the entire prescribed bandwidth.

In one embodiment, a method for managing data transmission comprises the steps of: (a) making a prescribed bandwidth on a network resource available to at least one requestor of a first type with a prescribed quality of service guarantee; (b) transmitting first data to or from the at least one requestor of the first type on the network resource using a first portion of the prescribed bandwidth, if the first data are available to be transferred to or from the at least one requestor of the first type; and (c) transmitting second data on the network resource to or from at least one requestor of a second type without a quality of service guarantee using a second portion of the prescribed bandwidth, if the first portion of the prescribed bandwidth is less than the entire prescribed bandwidth.

In some embodiments, a method of reporting a change in a network comprises the steps of: (1) determining a change in a network; (2) generating a first Layer 2 message in response to the change, the Layer 2 message indicating a change has occurred in the network, and (3) transmitting the first Layer 2 message to a node connected to the network, wherein upon receiving the first Layer 2 message the node transmits a notification to an upper layer application.

In some embodiments, a method for managing data transmission in a. shared network comprises the steps of: (a) making a prescribed bandwidth on a shared network resource available to at least one requestor with a prescribed quality of service guarantee for a first time interval; (b)

transmitting data to or from the at least one requestor on the shared network resource during the first time interval; and (c) releasing the shared network resource associated with the prescribed bandwidth at the expiration of the first time interval, if a request to make the prescribed bandwidth available for a second time interval is not received from the at least one requestor.

In some embodiments, a method of performing a network transaction at Layer 2 comprises the steps of (a) receiving at a network coordinator a Layer 2 request to perform a network transaction from a first node; (b) transmitting a first Layer 2 message from the network coordinator to at least one node connected to the network in response to the request; (c) receiving, at the network coordinator, a response to the first Layer 2 message from at least one node connected to the network, the response including network resource allocation data; (d) determining the capabilities of the network at the network coordinator based on the received. response to the first Layer 2 message; and (e) allocating network resources to perform the network transaction if the network coordinator determines there are sufficient network resources to perform the transaction.

DETAILED DESCRIPTION

Figure 1:
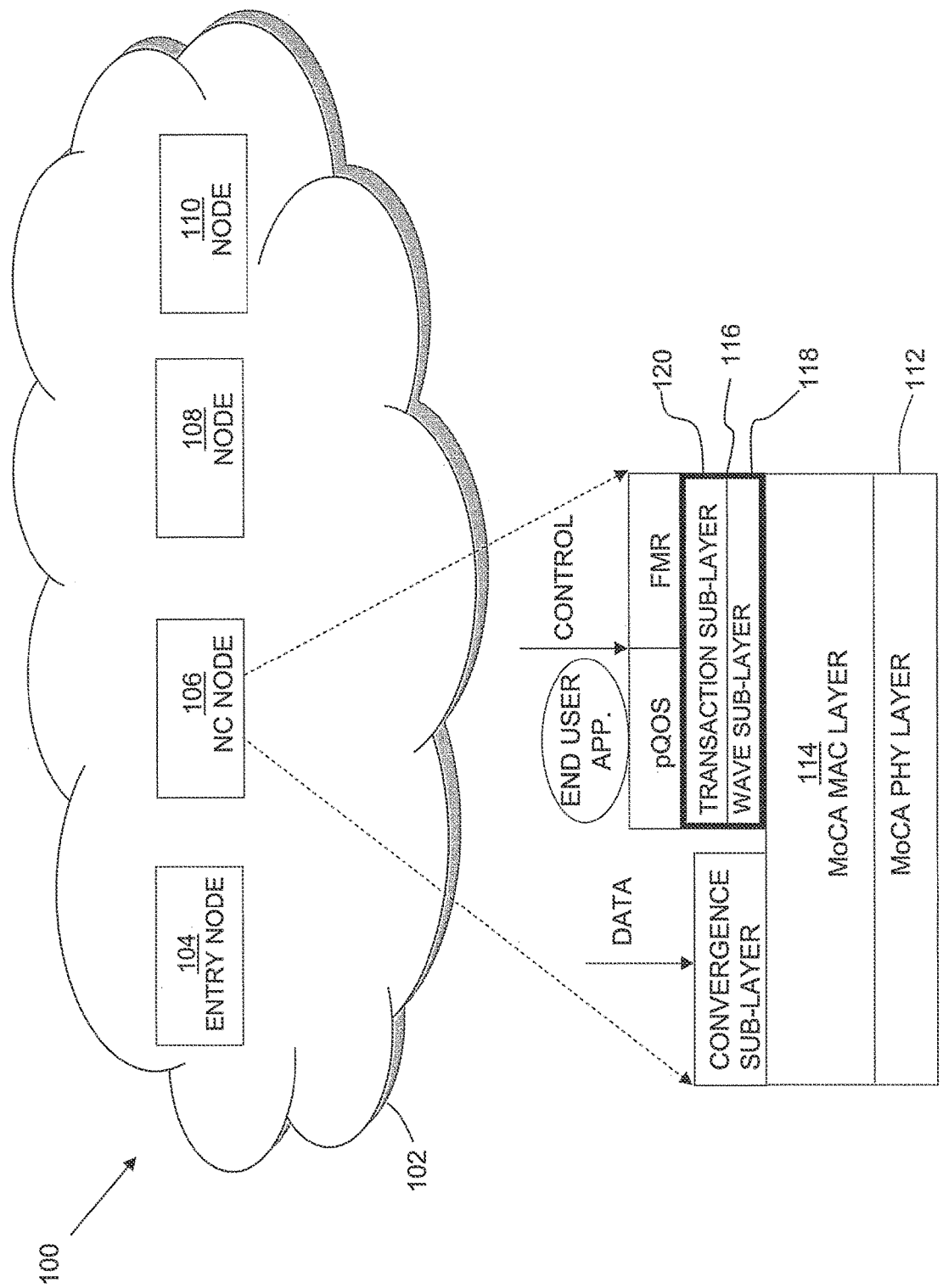
FIG. 1 illustrates one embodiment of a network architecture.

This description of the embodiments is intended to be read in connection with the accompanying drawings, which are to be considered part of the entire written description.

The embodiments relate in general to an apparatus, system, method, and architecture to support a low-level messaging framework in a network. Some embodiments facilitate Layer 2 messaging to enable low-cost and high-speed management of resources within the network in order to secure the capability to distribute multimedia data (such as video/audio, games, images, generic data and interactive services within existing in-home networks.

The embodiments facilitate making home networking devices simple so that they are easy to use and are cost-effective. In other words, home networks should be simple to configure so home users do not have to deal with complex configuration menus or require advanced knowledge of computer networks. The embodiments also resolve configuration and cost issues through the implementation of a low-level digital transport framework that does not require high amounts of computing power. This low-level framework may be thought of as an extension to the Media Access Control (MAC) sub-layer or the physical (PUT) network layer and is referred to as a "Layer 2 messaging framework."

Layer 2 messaging may be implemented in a variety of networks where a spectrum is shared and negotiated due to the introduction or removal of nodes as well as the evolution of network signaling capacity. In some embodiments, the network is a coordinated network having an NC that coordinates the communication between the several devices connected to the network. Coordination is achieved by the NC allocating time slots to network devices during which the devices may transmit or receive MAC messages, probes, and data. The network devices connected to the coordinated network may include managed and unmanaged devices. Examples of such networks include coaxial networks in accordance with the Multimedia over Coax Alliance (MoCA) standard, wired networks on "twisted-pair" wire, or Wireless home networks. Embodiments are described herein as being implemented with eight or 16 nodes within the network, However, other embodiments may incorporate extensions to enable any number of nodes within a variety of networks. Additionally, embodiments may include systems, methods and devices that include Layer 2 messaging architecture and protocols to support end-user applications and vendor-specific services.

Embodiments will now be described with reference to a Layer 2 Management Entity (L2ME) architecture and messaging protocol for a digital network. Some embodiments support application layer-triggered transactions, such as but not limited to, a Universal Plug and Play (UPnP) Quality of Service and IEEE Stream Reservation Protocol (SRP). Layer 2 messaging protocols may enable capabilities such as parameterized Quality of Service (pQoS) transactions within the network. Note that the interfaces between the L2ME and an application layer may vary.

FIG. 1 illustrates a coordinated mesh network architecture 100 with multiple network nodes 104, 106, 108, 110 connected to a network 102. Network node 106 is the NC node and is shown to be configured with PHY layer 112, MAC sub-layer 114, and an L2ME 116. Note that any network node may have multiple physical interfaces and may implement upper-layer functionality (e.g., TCP/IP, UDP, or the like). Network node 104 is an Entry node (EN). An EN can initiate a transaction, either on behalf of itself, any other network node, or a node outside of the network that communicates with the EN through a higher layer application. For example, the EN may be a computer having a. full protocol stack to initiate a transaction as a proxy for an ingress node that does not have a full protocol stack for interfacing to a user application. Each of nodes 104, 108, and 110 may also be configured with an L2ME 116.

L2ME 116 provides Layer 2 interfaces and management services through which Layer 2 management functions can be invoked. Based on end-user application initiated. transactions, L2ME 116 is responsible for executing and managing all LIME transactions, such as parameterized Quality of Service (pQoS), between network nodes 104, 106, 108, and 110. L2ME 116 includes two sub-layers: an upper Transaction Protocol sub-layer 120 and a lower Wave Protocol sub-layer 118. The L2ME Wave Protocol sub-layer 118 is a high-reliability message mechanism in L2ME 116 configured with its own messaging protocol. The L2ME Wave Protocol enables a network node to participate in robust, network-wide, low-latency generic transactions and enables NC node 106 to manage the flow of low-cost audio/video bridging devices, such as devices in accordance with the IEEE 802.1.Qat/D0.8 draft standard (July 2007), across a home network with multiple Layer 2 Quality of Service segments.

L2ME Wave Protocol

The L2ME Wave Protocol provides reliable transport service for L2ME Transaction Protocol by generating multiple Wave Cycles. A Wave Cycle starts when NC node 106 broadcasts a particular payload, such as a Request, to all nodes 104, 108, 110 connected to the network 102. In one embodiment, the NC node 106 first classifies all the nodes in the WAVE_NODEMASK field, described in greater detail below, into three categories before initiating the Wave Cycle. The first category of nodes ("Category 1 nodes") includes network nodes that have yet to be specified in the CYCLE_NODEMASK field of a Request L2ME Frame issued by the NC node 106. The second category of nodes ("Category 2 nodes") includes network nodes that have been identified in the CYCLE_NODEMASK field in a Request L2ME Frame issued by NC node 106, but from which NC node 106 has yet to receive a Response. The third category of network nodes ("Category 3 nodes") includes the network nodes from which NC node 106 has received a Response L2ME Frame.

After NC node 106 has appropriately categorized each of the network nodes 104, 108, 110 as Category 1, 2, or 3 nodes, NC node 106 constructs the CYCLE_NODEMASK in accordance with the following guidelines. First, if there are three or more Category 1 nodes, then NC node 106 sets a corresponding number of bits to "1" in the CYCLE_NODEMASK. However, if there are three or more Category 1 nodes, the number of bits set by NC node 106 in the CYCLE_NODEMASK may be less than the total number of Category 1 nodes, but not less than three bits. For example, if there are five Category 1 nodes, NC node 106 may set three, four, or five bits to "1" in the CYCLE_NODEMASK. Second, if there are three or more Category 2 nodes, NC node 106 sets three or more of the bits in the CYCLE_NODEMASK to "1", Which correspond to the Category 2 nodes. Third, if there are no Category 1 nodes, or if all of the bits corresponding to Category 1 nodes have already been set to "1" in the CYCLE_NODEMASK, then NC node 106 sets the bits corresponding to Category 2 nodes in the CYCLE_NODEMASK to "1". Finally, NC node 106 may set as many bits to "1" in the CYCLE_NODEMASK as NC node 106 may receive a Response from without disrupting network services. Once the CYCLE_NODEMASK has been generated, NC node 106 initiates the Wave Cycle by broadcasting an L2ME message that includes the CYCLE_NODEMASK.

A Wave Cycle is completed when either NC node 106 receives a corresponding payload, such as a Response, from some or all of the client nodes 104, 108, 110, or the NC node's timer expires. For example, NC node 106 transmits a message and then starts its timer. If the timer of NC node 106 reaches T21 (e.g., 20 milliseconds) before receiving a responsive message from some or all of the network nodes identified in the CYCLE_NODEMASK, then the Wave Cycle is completed even though NC node 106 has not received a responsive message. Note that T21 is the maximum allowable time interval between the transmission of a Request L2ME Frame by NC node 106 and the transmission of a corresponding Response L2ME Frame by the requested node. An L2ME Wave Cycle is successfully completed when each of the nodes identified in the WAVE_NODEMASK field of the payload have responded. Put another way, a Wave Cycle is successful if all of the network nodes 104, 108, 110 are classified as Category 3 nodes before the timer of NC node 106 reaches T21. Alternatively, a Wave Cycle is unsuccessful, or fails, if NC node 106 does not receive a Response L2ME Frame from a Category 2 node that had its corresponding bit set to "1" in the CYCLE_NODEMASK transmitted by NC node 106. If the Wave Cycle fails, then NC node 106 repeats the Wave Cycle by sending a multicast message to only those nodes from Which NC node 106 did not receive a Response LIME Frame. Note that in one embodiment, multicast messages are treated the same as broadcast messages with respect to repeating the Wave Cycle by sending a multicast message to the nodes that do not respond NC node 106 will complete the scheduled Wave Cycles before creating a new Wave Cycle for any node from which a Response was not received.

Figure 2:
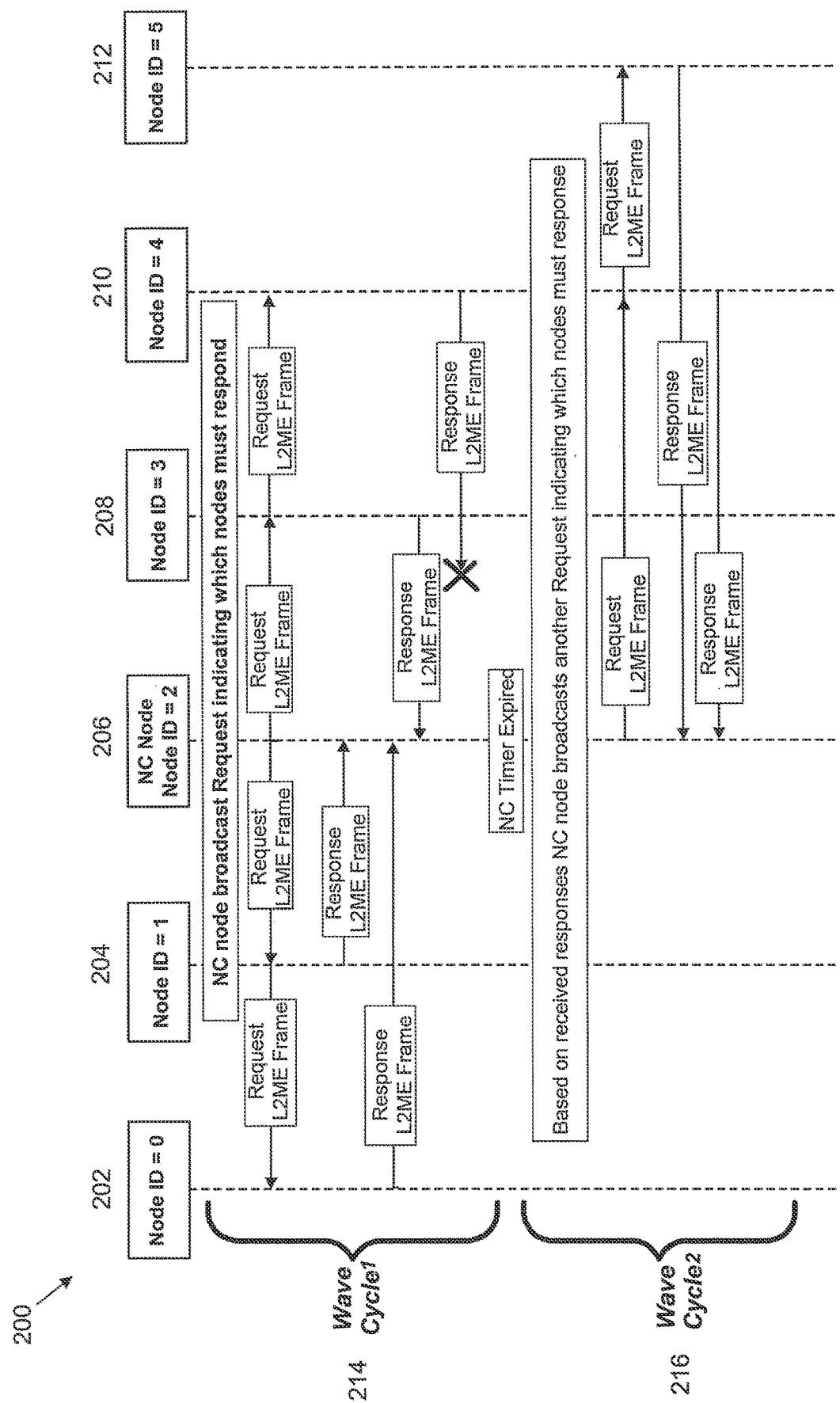
FIG. 2 is a diagram showing two L2ME Wave Cycles in accordance with the embodiment of FIG. 1.

FIG. 2 is an example of an LIME wave diagram 200 showing two Wave Cycles 214, 216. A first Wave Cycle 214 is initiated when NC node 206, with node ID=2, broadcasts a message having a payload to all nodes 202, 204, 208, 210, 212 connected to the network 102. In this example, the payload includes the NODE_BITMASK 011011, where the fight-most bit corresponds to the node with node ID=0. This bitmask indicates that NC node 206 expects to receive a payload containing a WAVE_ACK from nodes 202, 204, 208, and 210. As shown in FIG. 2, NC node 206 only receives a Response L2ME Frame from nodes 202, 204, and 208, and the Response L2ME Frame from node 210 is either lost or not received before the NC node 206 timer expires. The expiration of the timer in NC node 206 completes the first Wave Cycle 214, but does not finish the transaction.

Since NC node 206 has not received a Response L2ME Frame from node 210, NC node 206 sends another Request L2ME Frame to node 210, thereby initiating a second Wave Cycle 216. The Request sent to node 210 is also sent to node 212 and includes the NODE_BITMASK 110000 requesting client nodes 210 and 212 to send a WAVE_ACK to NC node 206. The Response L2ME Frames from nodes 210 and 212 are subsequently received by the NC node 206, thereby completing Wave Cycle 216.

L2ME Transaction Protocol

The L2ME Transaction Protocol is an upper sub-layer protocol in the LIME that uses multiple L2ME Waves to achieve network-wide transactions. In general, all the L2ME transactions comprise j+1 Waves (where j=0, 1, 2 . . . ) and are started by either an EN or the NC node, An EN may be any network node, including the NC node, which initiates an L2ME transaction based on an end-user application. In the final L2ME Wave, the requested results are returned to the EN by the NC node. The L2ME transaction is completed when the requested network nodes provide their final responses. In one embodiment, only one L2ME transaction is carried out or pending at any given time within the network. For a failed L2ME Wave, the resultant NC node action depends on the specific L2ME transaction type and the Wave number.

Figure 3:
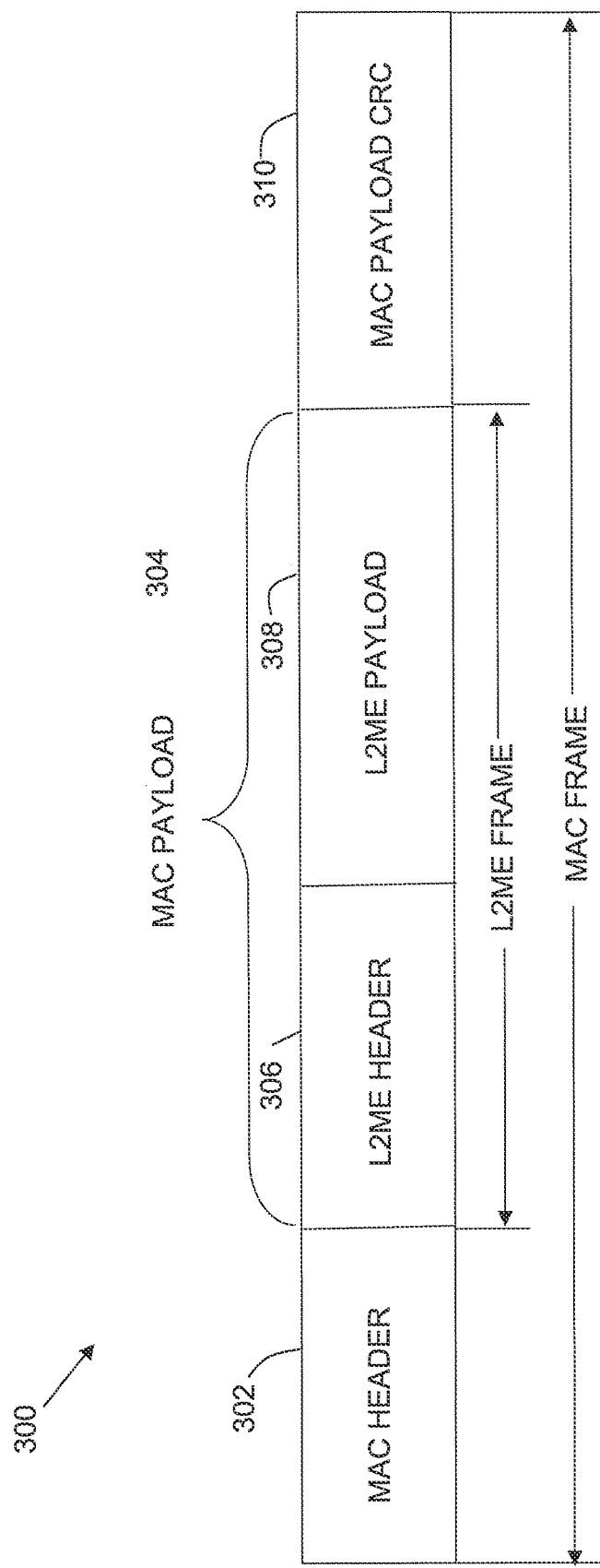
FIG. 3 illustrates a block diagram of an L2 ME Frame in accordance with the embodiment of FIG. 1.

In general, all LIME transaction messages may be classified into three different categories during a transaction. The messages are classified as follows: (1) Submit; (2) Request; and (3) Response. Nodes that do not use L2ME messages, such as legacy nodes not configured with an L2ME, may simply drop these messages. A node not configured with an L2ME may receive an L2ME message because the L2ME messages are embedded within the preexisting MAC messaging framework, FIG. 3 illustrates one example of a MAC frame 300. MAC frame 300 includes a MAC header 302, a MAC payload 304, and a MAC payload cyclic redundancy check (CRC) 310. L2ME frames are embedded within the MAC payload 304 and include an L2ME header 306 and an L2ME payload 308.

Submit L2ME Messages

The Submit L2ME messages carry application-initiated requests from an EN to the NC node where an L2ME Wave transaction may be initiated. An EN is usually responsible for managing the various stages of a transaction while the NC node is responsible for broadcasting the Request, gathering the Response of each node, and providing the transaction results to the EN that transmitted the Submit message. Table 1 below illustrates one example of a Submit L2ME Frame format, which includes a Submit L2ME Frame header and payload.

TABLE 1

| Submit L2ME Message Format | | |
|---|---|---|
| Field | Length | Usage |
| Submit L2ME Header | | |
| HDR_FMT | 8 bits | 0x8 |
| ENTRY_NODE_ID | 8 bits | The ID of the node sending this message. |
| ENTRY_INDEX | 8 bits | An Entry node provided value; MAY be used by Entry node to track responses to this Submit message |
| RESERVED | 8 bits | 0x0; Type III |
| VENDOR_ID | 16 bits | |
| TRANS_TYPE | 8 bits | Type of L2ME transaction defined for VENDOR_ID=0; All other values are reserved<br>If VENDOR_ID=0<br>  0x1=PQoS transactions<br>  0x2=FMR<br>The use of this field for other values of VENDOR_ID is vendor specific |
| TRANS_SUBTYPE | 8 bits | Subtype of L2ME transaction defined for a VENDOR_ID and TRANS_TYPE; all values are reserved except for<br>If VENDOR_ID=0<br>  If TRANS_TYPE=0x1<br>    0x1=CREATE<br>    0x2=UPDATE<br>    0x3=DELETE<br>    0x4=LIST<br>    0x5=QUERY<br>    0x6=MAINTENANCE<br>  If TRANS_TYPE=2<br>    0x1=FMR transaction<br>The use of this field for other values of VENDOR_ID is vendor specific |
| WAVE0_NODEMASK | 32 bits | Nodemask specifying nodes that are part of the L2ME Wave 0 |
| RESERVED | 32 bits | 0x0; Type III |
| RESERVED | 8 bits | 0x0; Type III |
| MSG_PRIORTTY | 8 bits | Allowed values: 0xFF where 0xFF is the highest priority; NC node MAY process received Submit messages based on MSG_PRIORITY field value |
| TXN_LAST_WAVE_NUM | 8 bits | Allowed values 0x00-0x04; value=the [total number of Waves −1] in an error free transaction |
| RESERVED | 8 bits | 0x0; Type III |
| L2ME Transaction Payload | | |
| L2ME_PAYLOAD | 0-N bytes | L2ME payload is L2ME Wave and transaction specific |

The Submit L2ME Frame header includes an 8-bit ENTRY_TXN_ID field. The ENTRY_TXN_ID field is the Entry Node's transaction ID, which starts at "1" and is incremented each time a Submit message is sent to the NC node. The EN_TXN_ID=0 value is reserved for the NC node when there is no EN. Any L2ME, transaction that results from a Submit message may contain this transaction ID. Note that a combination of the Entry node ID with the transaction ID uniquely identifies each L2ME transaction in the network allowing an EN to know that its transaction has been triggered. Additionally, uniquely identifying each transaction allows the EN to recognize and cancel any attempt by the NC node to start a transaction if the EN has already timed out waiting for the transaction to begin. The composition and length of the L2ME_PAYLOAD field depends on the specific VENDOR_ID, TRANS_TYPE, and TRANS_SUBTYPE fields. The VENDOR_ID is a 16-bit field in the Submit and Request L2ME messages that indicates a vendor-specific use of various fields of the messages, For example, the assigned VENDOR_ID range for Entropic Communications is 0x0010 to 0x001F, and the values 0x0000 to 0x000F are assigned to MoCA. The length of the L2ME_PAYLOAD field may be shorter or equal to L_SUB_MAX. Also note that Submit and Request messages associated with a given L2ME transaction may have an identical set of VENDOR_ID, TRANS_TYPE, and TRANS_SUBTYPE fields.

Request L2ME Messages

Request LIME Frame messages are broadcast to all nodes by the NC node during a transaction Wave. In one embodiment in which a Submit message has been received by the NC node, the NC node will broadcast a Request L2ME Frame message as a consequence of the Submit message. In some cases, when an NC node is acting as the EN, as described below, no Submit message is transmitted and the NC node initiates the transaction by issuing the Request L2ME Frame message on its own behalf. For example, when the NC node initiates a management transaction, a Submit L2ME Frame is not needed and the transaction begins with the Request L2ME Frame. Each client node receiving a Request L2ME Frame message is expected to respond to the NC node with results of the operation as requested by the NC node in the payload. Table 2 shows the Request L2ME Frame message header and payload format, which is similar to the Submit L2ME Frame format where the MAC header is not shown.

TABLE 2

Request L2ME Frame Message Format

| Field | Length | Usage |
|---|---|---|
| Request L2ME Transaction Header | | |
| HDR_FMT | 8 bits | 0x9 |
| ENTRY_NODE_ID | 8 bits | The ID of the Entry node that requested the transaction; 0xFF=no Entry node |
| ENTRY_INDEX | 8 bits | Copied from initiating Submit; 0=no Entry node |
| WAVE_SEQ_N | 8 bits | An NC counter, which is held constant for all the L2ME Wave Cycles in an L2ME Wave, and is incremented when a new L2ME Wave starts; |
| VENDOR_ID | 16 bits | Copied from initiating Submit or NC node specified if ENTRY_NODE_ID=0xFF |
| TRANS_TYPE | 8 bits | Copied from initiating Submit or NC node specified if ENTRY_NODE_ID=0xFF |
| TRANS_SUBTYPE | 8 bits | Copied from initiating Submit or NC node specified if ENTRY_NODE_ID=0xFF |
| WAVE_NODEMASK | 32 bits | If TXN_WAVE_N=0 If there is an Entry node, copied from initiating Submit field WAVE0_NODEMASK |
| CYCLE_NODEMASK | 32 bits | The subset of WAVE_NODEMASK where the NC node is to receive a Response in this Wave Cycle; |
| WAVE_STATUS | 8 bits | Bits 7:3 reserved Type III Bit 2: RESP_FAIL - 1 if response was not received from the requested node in previous Wave. This indicates to all nodes that this is the last L2ME Wave due to transaction failure; otherwise = 0 Bit 1: reserved Type III Bit 0: FINAL_SUCCESS - 1 if the NC node declare this Wave as the last Wave with no errors; otherwise = 0 |
| DIR_LEN | 8 bits | 0x10 - If L2ME_PAYLOAD field has payload type "concatenated"; otherwise 0x0 |
| TXN_SEQ_N | 8 bits | A transaction sequence number, which is held constant for all the L2ME Waves in an L2ME transaction, and is incremented by the NC node when by a new L2ME transaction starts |
| TXN_WAVE_N | 8 bits | Wave number within the L2ME transaction, starting with 0 for initial Wave, and incremented by 1 for each subsequent Wave. |
| L2ME Transaction Payload | | |
| L2ME_PAYLOAD | 0-N bytes | One of four different payload types described below. |

In this message, the ENTRY_NODE_ID is copied from the initiating SUBMIT message. If the Request message results from an L2ME transaction without an EN, such as an NC management transaction, then the ENTRY_NODE_TXN_ID has no meaning and the field value is reset to "0". The WAVE_NODEMASK value is identical to the Submit message if this is the first L2ME Wave. In the last L2ME Wave in the transaction, the value of this field contains the set of nodes that are to be part of the last Wave. Otherwise, the WAVE_NODEMASK value corresponds to the set of nodes that provided a Response in the IN_NEXT_WAVE bit of the previous Request. The CYCLE_NODEMASK is the bitmask of the nodes where each bit position corresponds to the node ID (i.e., bit 0 value corresponds to node ID=0). The bit corresponding to each node is set if the node is instructed by the NC node to provide a Response upon receiving the Request message. In addition, the Request message includes the WAVE_STATUS field, which indicates if the previous Wave Cycle failed or completed successfully. Note that the allowed values in the WAVE_STATUS field are 0, 1, 2 and 4, and if the RESP_FAIL and/or NC_CANCEL_FAIL bits are set, this is the last L2ME Wave of the transaction and any following Wave may contain the L2ME_PAYLOAD field of the failed transaction.

The payload of the Response frame for the L2ME Waves except for Wave 0) is typically formed by concatenating the Responses from the nodes in the previous wave. The concatenation is formed as follows: when a Response L2ME Frame arrives at the NC node from a given node, its payload is appended to the end of a Response queue at the NC node. Then, the length of the payload is written into a data structure, called a directory, and the node's ID is transmitted. When the NC node is ready to send the next Request L2ME Frame, it places the length of the directory into a DIR_LEN field, copies the directory into the beginning of the payload, and then copies the Response queue into the remainder of the payload.

The DIR_LEN field indicates the length of a directory in the payload portion of the Request L2ME Frame message. There are four different types of L2ME_PAYLOAD fields that are used in a Request L2ME Frame message, which are as follows:

1. The first type of L2ME_PAYLOAD is identical to the payload of the Submit message if it is the first L2ME Wave of a given transaction. The length of this L2ME_PAYLOAD field may be less than or equal to L_SUB_MAX, which is the maximum number of bytes in the concatenated Submit L2ME Frame payload.
2. The second type of Request L2ME Frame payload is sent as a report from the NC node to the participating nodes starting from the second through the final Wave of the transaction as shown in Table 3 below. The L2ME_PAYLOAD field comprises a 16-entry directory with a 2 byte entry from each node, and a RESP_DATA field, which is a concatenation of the variable-length. Response LIME Frame from each of the participating L2ME nodes that provided a Response in the previous Wave. This directory enables the receiving node to decode the L2ME Responses from all the nodes.

TABLE 3

| Request "Concatenated" L2ME Frame Payload Format | | |
| --- | --- | --- |
| Field | Length | Usage |
| | | Request L2ME Frame Concatenated Payload |
| For (i=0; i<N; i++) { | | N=DIR_LEN |
| DIR_NODE_ID | 8 bits | Node ID that sent Response i or 0xFF if directory entry i and subsequent directory entries are unused |
| DIR_RESP_INFO | 8 bits | Values [0... (L_RESP_MAX)] indicate the length of the payload in the Response from DIR_NODE_ID in units of 4 byte words. The following values have special meanings and indicate zero length: UNRECOGNIZED=0xFF - the node's Response header indicated it couldn't interpret the previous Request OVERFLOW=0xFE - the node's Response could not be included given L_REQ_MAX. |
| } | | |
| RESP_DATA | 0-N words | An integral number of variable length Response payloads, parsable by traversing lengths interpreted from the directory. |

3. The third type of L2ME_PAYLOAD is in the case of a failed L2ME transaction where the RESP_FAIL bit or NC_FAIL bit is set to "1". The NC node may transmit a zero-length payload in the Request message of the final L2ME Wave.
4. The fourth type of L2ME_PAYLOAD is used to support some specific L2ME transactions such as parameterized Quality of Service. In this payload, the DIR_LEN in the Request L2ME Frame header is not used, and the NC node processes the Responses of all the nodes to produce a custom Request Frame payload. The format of the L2ME_PAYLOAD field is defined in the specific L2ME transaction. Note that Request Frames with no payload consist of a 64-bit Type III reserved field.

Response L2ME Message Format

The Response L2ME Frame format is shown in Table 4 below. Response L2ME Frames are sent unicast from each L2ME transaction capable node to the NC node at the end of each L2ME Wave. In some embodiments, the NC node may be configured to simultaneously receive multiple (e.g., three or more) Responses from the requested nodes.

TABLE 4

Response L2ME Frame Format

| Field | Length | Usage |
|---|---|---|
| Response L2ME Transaction Header | | |
| HDR_FMT | 8 bits | 0xA |
| RESP_STATUS | 8 bit | Bits 7:4 - reserved Type III<br>Bit 3: DO_ENTRY_CANCEL=1 iff the Entry node requires during Wave 0 that the NC node not to issue further Waves in the transaction<br>Bit 2: IN_NEXT_WAVE=1 iff the node will be included in WAVE_NODEMASK in the next Wave<br>Bit 1: reserved Type III<br>Bit 0: INTERPRETED=1 if the node fully recognized the Request message |
| RESERVED | 8 bits | Type III |
| WAVE_SEQ_N | 8 bits | Copied from initiating Request |
| RESERVED | 32 bits | Type III |
| L2ME Transaction Response Payload (Optional) | | |
| L2ME_PAYLOAD | 0-N words | The length is less than or equal to L_RESP_MAX; no payload in the Response if this is the final Wave of the transaction; divisible evenly by 4 |

The Response L2ME message includes a RESP_STATUS field, which indicates the response status of a node that was requested to respond in the next or final Wave Cycle. In addition, the RESP_STATUS field allows an EN to cancel a transaction it initiated by sending a Submit message to the NC node, but timed out waiting for the Response message.

If an L2ME-enabled network node receives any L2ME transaction messages with an unrecognized VENDOR_ID, TRANS_TYPE, or TRANS_SUBTYPE field value, then the node may set the RESP_STATUS field to "0" in the Response Frame and the NC node may preclude this node from future Waves in the transaction. The EN and any other node that sets the IN_FINAL_WAVE bit in any Response may be included in the WAVE_NODEMASK of the final Wave.

L2ME Transaction Overview

L2ME transactions may be initiated in multiple ways, although usually only one L2ME transaction may be carried out at any given time within a network. In one embodiment, an L2ME transaction may be initiated by an EN, which may be any node connected to the network. For example, the EN may be a MoCA network node connected to a computer. The computer may be attached to the Internet and running an application that communicates by way of a higher layer protocol interface. In this configuration, the computer may use the EN as a proxy, described in greater detail below, to monitor the entire MoCA network through L2ME messaging in response to application-generated operations within the computer.

Figure 4:
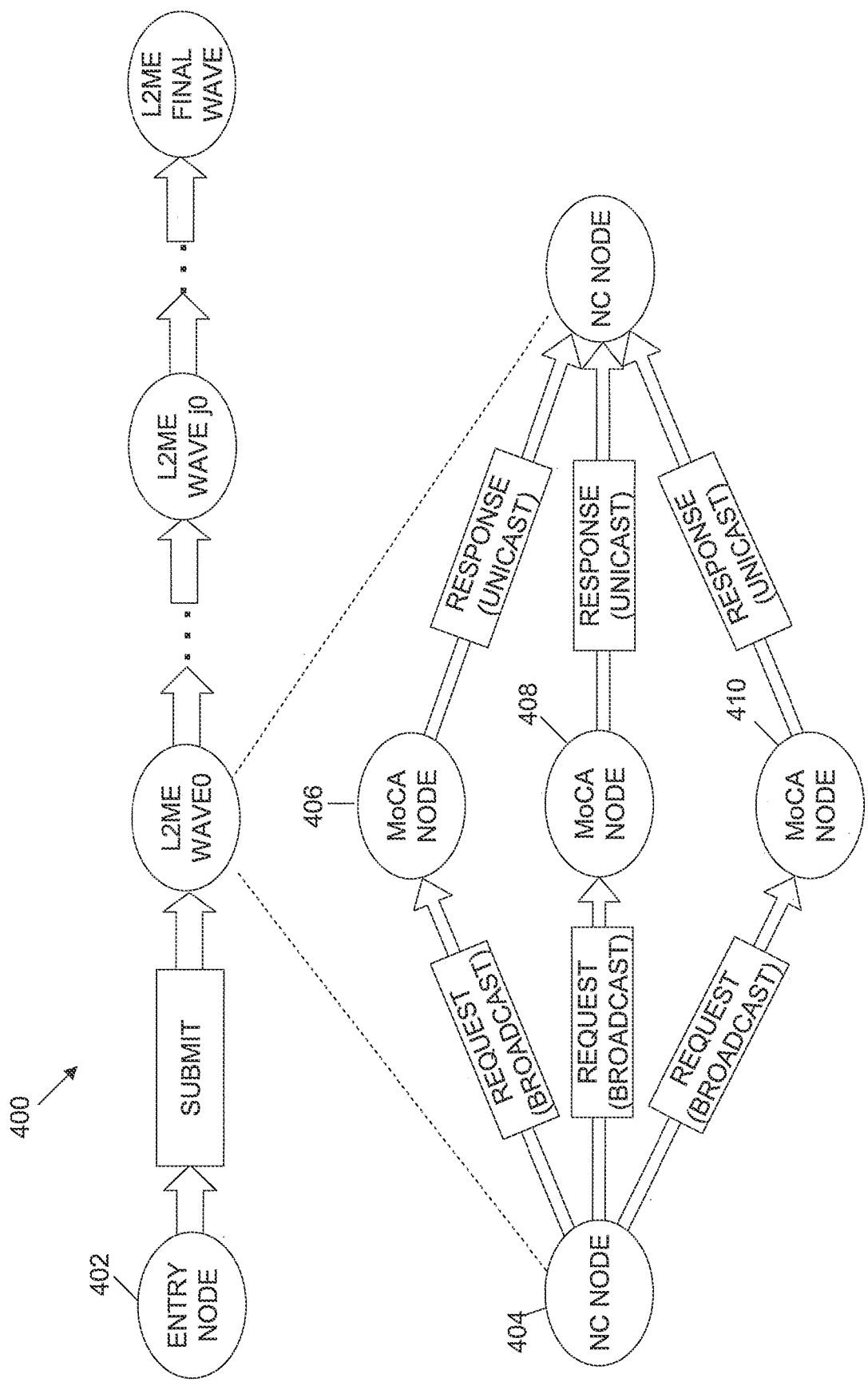
FIG. 4 is a block diagram of a Layer 2 Management Entity transaction protocol in accordance with one embodiment.

With reference to FIG. 4, one example of an EN-initiated transaction. is now described. FIG. 4 illustrates a block diagram of one example of an L2ME transaction 400 initiated by EN 402. Upon receiving a request from an upper-level application, EN 402 generates and transmits a Submit L2ME message to NC node 404. NC node 404 receives the Submit message and initiates a first L2ME Wave, L2ME Wave 0, by broadcasting a Request message with a similar header to the Submit message received from EN 402. The Request message is broadcast to each of the L2ME capable nodes 406, 408, 410 specified by the WAVE_NODEMASK field contained in the payload. If this Request is sent to a node which is not L2ME capable, the node simply ignores this message.

The Request L2ME Frame message is also sent to EN 402 for reasons now described. Upon receiving the Request message, EN 402 verifies the transaction by comparing the appropriate field in the Request header with values it used in the Submit header. If the values match, the transaction will be processed. However, there may be some instances when the L2ME transaction in the network is not the most recent transaction requested by EN 402. This situation arises when the Submit message transmitted by EN 402 was corrupted, not received, or not granted by the NC node 404. If the initiated transaction is not the most recently requested L2ME transaction, EN 402 may cancel the transaction by setting the DO_ENTRY_CANCEL bit to "1" in the Response. Upon receiving a Response from EN 402 with the DO_ENTRY_CANCEL bit set to "1", the NC node 404 will not issue more L2ME Waves in this transaction, but may immediately initiate another L2ME transaction.

Assuming the L2ME transaction is not canceled by EN 402, the requested L2ME transaction-capable nodes send a Response message to NC node 404 with a payload indicating whether or not they are opting to participate in the next Wave(s) of this transaction. A node may opt not to participate in future Waves if, for example, the transaction is a parameterized QoS transaction to create a new parameterized QoS flow and the node cannot support the parameterized QoS flow. A node may opt to participate in the network transaction by setting the IN_NEXT_WAVE bit to "1" and may opt to not participate by setting the IN_NEXT_WAVE bit to "0". In the following L2ME Waves, NC node 404 typically generates the Request L2ME Frame payload by concatenating all Responses from the previous Wave as described above. The NC node 404 then sends this Request message to nodes that requested participation in the current Wave. Note that for some transaction embodiments, the NC node may produce a distinct, non-concatenated Request message payload from the received Response payloads. The transaction continues until the NC node reaches the maximum number of Waves specified in the Submit LIME message. Upon reaching the maximum number of Waves in the transaction, NC node 404 issues the final Wave, which comprises a Request L2ME Frame message to the EN 402.

However, if NC node 404 receives Responses from all of the L2ME capable nodes with the IN_NEXT_WAVE bit set to "0" and there is an EN 402, then NC node 404 may skip intermediate Waves in the transaction and synthesize an appropriate Request payload. If the REQUEST payload would have been created using concatenation, then NC node 404 fills the directory with DIR_NODE_ID=0xFF in all of the entries and the synthesized Request may have the TXN_WAVE_N properly set for the final Wave.

In a number of L2ME transactions, NC node 404 may request only EN 402 to provide a Response to its Request message after all other client nodes have responded. This Response, which completes the L2ME, Wave in various transactions, ensures that the L2ME transaction has been fully completed before EN 402 notifies its application that the transaction is completed. In other L2ME transactions, the transaction is not completed until NC node 404 sends a Request to multiple nodes, including EN 402, and receives a Response from each of the nodes.

In some instances, an entire L2ME transaction may result in an error. This situation arises if, for example, (1) an L2ME Wave Cycle fails; (2) the number of executed L2ME Waves in a given transaction is less than the expected total number of L2ME Waves as indicated in the TXN_LAST_WAVE_NUM field in the initiating Submit LIME message; and (3) the L2ME transaction was initiated by an EN. In one embodiment, if an L2ME transaction fails, NC node 404 issues a new L2ME Wave called a transaction-failed Wave. This Wave announces the termination of the transaction due to the failure of the previous L2ME Wave. The transaction-failed Wave is initiated by NC node 404 sending a Request L2ME Frame header, as defined in Table 2 above, with the WAVE_STATUS field set to "4" and the WAVE_NODEMASK having the bit corresponding to EN 402 set to "1". Additionally, the Request L2ME. Frame is a zero-length payload as described above. Upon receipt of this Request EN 402 sends a Response L2MB Frame as shown in Table 4 above.

In another embodiment, NC node 404 may autonomously initiate an L2ME transaction to inform the network nodes which other nodes are L2ME transaction-capable. These NC node initiated transactions are usually conducted in a single Wave and are designed to achieve network maintenance by providing interoperability with legacy or other compatible nodes. L2ME Wave operations initiated by the NC node usually have the following characteristics:

1. In order to bound the Wave duration, the NC node should include at least three nodes in the CYCLE_NODEMASK field;
2. If the NC node does not receive the expected Response from the requested node within NC_TIMEOUT, the NC node assumes that the Response is no longer outstanding;
3. The NC node may not request a node to re-transmit its response before all the other nodes have been asked to first send their Responses; and
4. Any node that fails to provide a Response, when requested, within T21 of the second Request causes an L2ME Wave failure.

The WAVE_NODEMASK field indicates the set of nodes that are recognized by the NC node 404 as an L2ME transaction-enabled node. If the node is recognized by the NC node 404, then it responds using a zero-length Response message to complete the transaction in accordance with Table 5 below.

TABLE 5

Response L2ME-Enabled Frame Format

| Field | Length | Description |
|---|---|---|
| Response L2ME Header | | |
| HDR_FMT | 8 bits | |
| RESP_STATUS | 8 bits | Ignored by receiving node |
| RESERVED | 8 bits | Type III |
| WAVE_SEQ_N | 8 bits | Copied from initiating Request |
| RESERVED | 32 bits | Type III |
| Response L2ME Payload | | |
| RESERVED | 32 bits | 0; Type III |

Parameterized Quality of Service Architecture

One embodiment of a network parameterized Quality of Service (pQoS) segment is now described. Note that a borne network may include multiple pQoS segments, such as a coaxial network, MoCA segment and an IEEE 802.11 segment. A pQoS segment may be any group of networked nodes that share the same PHY and MAC layers, which ensures that a flow entering the network at an ingress node will reach one or more egress nodes with a pQoS guarantee. A pQoS guarantee is an assurance that at least a predetermined data rate will be provided for the communication of data from the ingress node to the egress node within a predetermined time, e.g., a cycle. In one embodiment of a pQoS-enabled network, the flows in a network may be guaranteed and/or best effort flows. The guaranteed flows arc ensured at least one level of performance defined by the parameters of the flow. A time slot reserved for a parameterized flow may be made available to other flows if the parameterized flow does not have data to transmit during its time slot. In one embodiment, each pQoS segment has its own ID, which is typically the MAC address of the NC node or the channel number of the radio frequency on which the channel works. An upper-layer pQoS logical entity may be configured to dictate how a flow can be set up across several. pQoS segments.

Generally, networks may be divided into three categories: (1) legacy networks, such as networks without L2ME transaction or pQoS functionality; (2) networks with pQoS enabled; and (3) networks with pQoS disabled. Any network node operating in an L2ME enabled network will behave as a legacy device if the node is operating in a network with other legacy devices. In one embodiment, each network node has an L2ME and pQoS functionality.

In some embodiments, the pQoS operation is disabled if any one of the network nodes does not support pQoS. For example, if a non-pQoS-capable node joins a pQoS-enabled network, the network will cease supporting pQoS, and will also stop creating new pQoS flows until all network nodes are pQoS capable. If a network node attempts to create a new pQoS flow, an error message will be transmitted to the network node requesting to setup the new flow. Additionally, pQoS flows will no longer be guaranteed and packets will be treated as prioritized or best effort traffic. However, if a non-pQoS-capable node leaves the network leaving only pQoS-capable nodes, then the network may upgrade and enable pQoS transmission. Upon the upgrading to pQoS, prioritized flows will remain as prioritized flows until updated by an ingress node by an update as described below.

Figure 5:
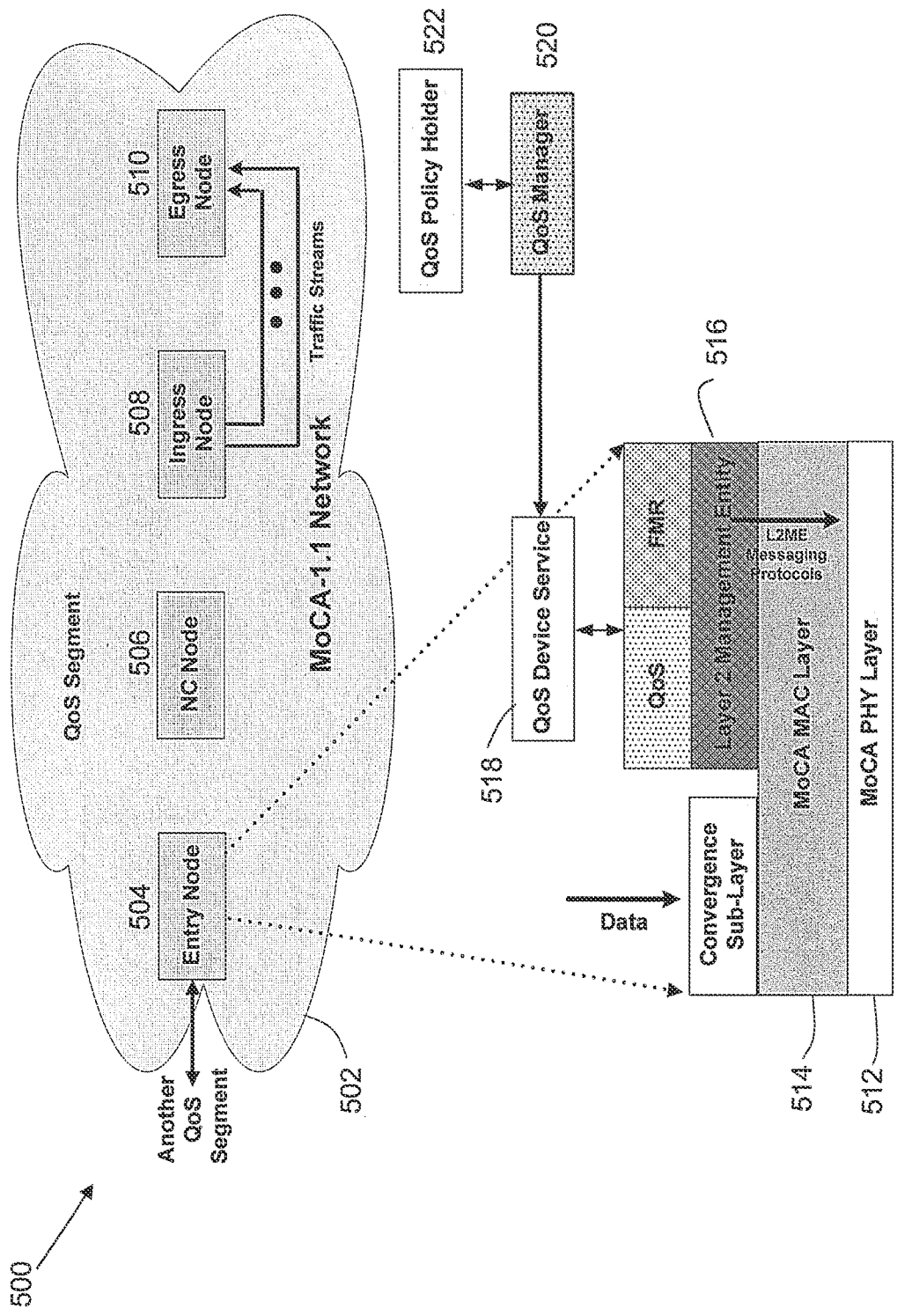
FIG. 5 illustrates an embodiment of a parameterized quality of service network architecture.

With reference to FIG. 5, one embodiment of a pQoS architecture, based on the LIVE architecture, is now described. Parameterized QoS network architecture 500 includes a network 502 having multiple nodes 504, 506, 508, 510. Network 502 may be a coordinated network including a coaxial network in accordance with the MoCA standards, a mesh network, or a wireless network. In one embodiment, each of the several nodes 504, 506, 508, 510 has a PHY layer 512, a MAC sub-layer 514, and an LIME 516. In a UPnP Quality of Service environment, L2ME 516 interfaces to the QoS Device Service 518. In a non-UPnP environment, the L2ME interfaces to an appropriate QoS application entity (not shown) for QoS management. LIME 516 is further configured to adapt messages from upper layer applications into Layer 2 compatible messages as explained in greater detail below.

The several nodes 504, 506, 508, 510 are also configured with upper level capability, which includes a QoS Device Service 518, a QoS Manager Service 520, and a QoS Policy Holder service 522. The QoS Device Service 518 receives action invocations from the QoS Manager Service 520 and reports the results of the action back to the QoS Manager Service 520. The QoS Device 518 will execute actions on its own or by utilizing a lower layer through L2ME 516. L2ME 516 also may get notifications from Layer 2 regarding the current state and a change of state in Layer 1 or Layer 2. The L2ME 516 is configured to isolate Layer 2 issues from higher layer(s) and hide lower layer details and specificities from the high layer(s).

As illustrated in FIG. 5, node 504 is an Entry node and node 506 is the NC node. Nodes 508 and 510 are ingress and egress nodes, respectively. Note that in any network 502 there may be multiple egress nodes 510. Assume that an end-user application requires a specific bandwidth for a flow, e.g., a video stream, from ingress node 508 (source device) to egress node 510 (sink device). A traffic stream is typically viewed as a stream with unidirectional flow from ingress node 508 to egress node 510. The end-user application typically is aware of the identity of the ingress node, the egress node, and the streamed content. The end-user application also may be aware of the Traffic Specification (TSpec XML) of the content.

TSpec XML may include a variety of parameters that describe the bandwidth, packet-size, latency, and loss tolerance of a flow. Some of the bandwidth parameters include the mean data rate, peak data rate, and maximum burst size. The packet-size parameters may specify the minimum and maximum packet size as well as a nominal packet size. Latency parameters include maximum delay variation as well as the maximum and minimum service intervals.

Figure 6:
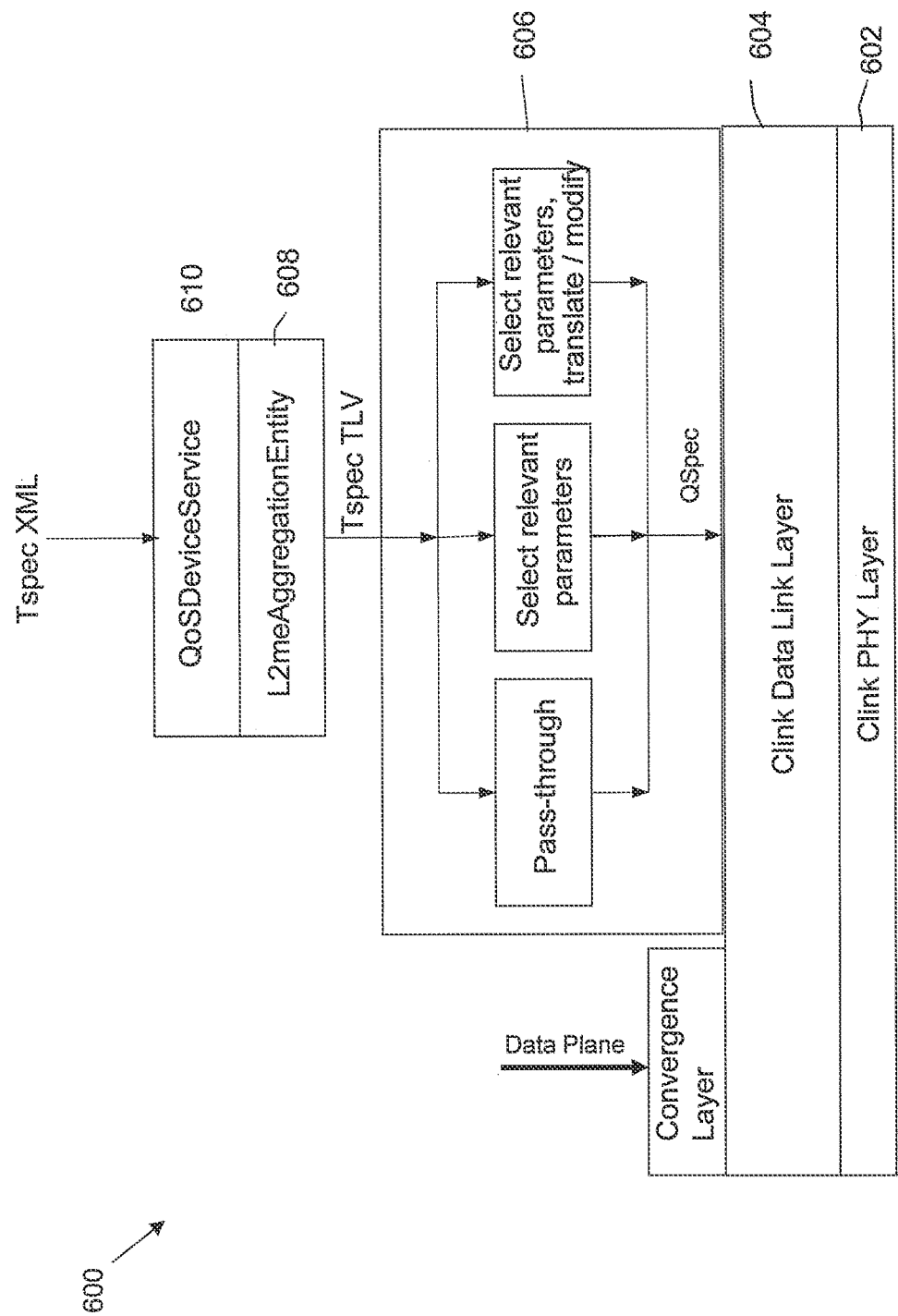
FIG. 6 illustrates one example of a decision tree of an L2ME converting TSpec XML into QSpec.

In the pQoS environment and as shown in FIG. 6, the L2ME 606 is adapted to translate the TSpec XML into a Layer 2 specific QSpec. The LIME 606 may translate QSpec from TSpec XML by simply using TSpec XML as QSpec, selecting some of the parameters of the TSpec XML for QSpec and ignoring other parameters, or selecting some of the parameters of TSpec XML and translating the parameters into QSpec format. Some of the QSpec parameters may include the service type, the peak data rate, the mean data rate, and the minimum, maximum, and nominal packet size.

The end-user application constructs a Traffic Descriptor and requests QoS Manager 520 to setup the required QoS resources for the requested flow. The Traffic Descriptor includes the Traffic ID tuple {SourceIPAddress, SourcePort, DestinationAddress, DestinationPort, IpProtocol} information together with the path information received from each QoS Device Service 518. QoS Manager 520, acting on behalf of the end-user application, requests the QoS Policy Holder Service 522 to provide the appropriate policy for the requested flow as described by the Traffic Descriptor. The QoS Policy Holder service 522; which is a repository of QoS policies for the network 502, provides the QoS Manager 520 with the appropriate policy for the requested flow. This policy may be used to set the relative importance of the traffic flow. The user importance number is used to ensure that traffic streams of the greatest importance to a user(s) receive the corresponding priority to the network resources. Based on this policy, QoS Manager 520 configures the QoS Device Service 518 thereby enabling ingress node 508 and egress node 510 to handle the traffic stream. Note that the QoS Policy Holder 522 and QoS Manager 520 services may reside either on any network node 504, 506, 508, 510 or on another pQoS segment.

Cost of pQoS Flow

Prior to admitting or updating pQoS flows in a network, the NC node 506 must decide if the specific flow request can be granted, e.g., if there are sufficient network resources available. The NC node 506 makes the decision on whether or not the flow should be admitted by first determining the Cost of a pQoS flow. The Cost of a Flow (CF) is a measure of the specific bandwidth required to support a given pQoS flow, and is expressed in the SLOT_TIME field (i.e., slot times, where a slot time is a unit of measure equal to 20 ns). Note that in one embodiment, the basic bandwidth. unit is a time slot and not a transfer rate (e.g., Mbits/s). However, in an alternative embodiment, the CF is provided as a transfer rate.

For every Create or Update pQoS flow transaction, defined in greater detail below, the CF may be periodically calculated by the ingress node 508. The NC node 506 may use this CF calculation to decide if the requested pQoS flow is allowed in the network. The CF (multiple of SLOT_TIME/second) may be calculated as follows:

$$CF_{new} = N_{PPS} \text{MAX} \left\{ T_{MIN}, \left\{ \left[ \left( \frac{8 \cdot L_p}{OFDM_b} \right) \right] (T_{CP} + T_{FFT}) + T_{IFG} + T_{PRE} \right\} \right\} \quad \text{Eq. (1)}$$

Where,

TABLE 6

| List of Eq. (1) Parameters | |
|---|---|
| Parameter Name | Description |
| $N_{PPS}$ | Total number of transmitted packets/second |
| $T_{MIN}$ | Minimum packet size transmission time |
| $L_P$ | Packet length (bytes) including the RS pad |
| $OFDM_B$ | Number of bits per OFDM symbol based on PHY Profile used for the transmission |
| $T_{CP}$ | Cyclic prefix length (multiple of SLOT_TIME) |
| $T_{FFT}$ | IFFT/FFT period (multiple of SLOT_TIME) |
| $T_{IFG}$ | IFG period (multiple of SLOT_TIME) |
| $L_{PRE}$ | Length of the preamble per packet (multiple of SLOT_TIME) |

$N_{PPS}$MAX is the number of Orthogonal Frequency Division. Multiplexing (OFDM) symbols/packets where ⅡX⌉ is the rounded-up integer of X, which is multiplied by the OFDM symbol length (# of SLOT_TIME/second). Note that the length of OFDM symbol depends on the network channel characteristics. After adding the preamble length and the interframe gap (IFG) length per packet, $N_{PPS}$MAX is multiplied by the total number of transmitted packets per second, which is given by the peak packet rate divided by the nominal packet size. The cost of all existing flows, N, (with no packet aggregation) for each ingress node 508 is given by:

$$CF_{node} = \sum_{i=1}^{N} CF_i \qquad \text{Eq. (2)}$$

In order for an ingress node 508 to accept a new flow, its maximum available bandwidth must be greater than or equal to the cost of the current flow and the new flow. This condition is given by:

$$BW_i(\max) \geq CF_{new} + CF_{node} = CF_{new} + \sum_{j=1}^{N} CF_i \qquad \text{Eq. (3)}$$

Once the new pQoS flow has been accepted by the ingress node, the NC node 506 decides if the cost of all the aggregated pQoS flows on all the nodes including the cost of the new pQoS flow is less than or equal to the total maximum available network bandwidth. Assuming M nodes in the network, the total available network bandwidth must satisfy the condition:

$$0.8[BW_{NC}(\text{total}) - C(\text{overhead})] \geq CFnew + \sum_{j=1}^{M} CF_{node}^{j} \qquad \text{Eq. (4)}$$

Where $BW_{NC}$ is the total network bandwidth. In some embodiments, the total available bandwidth in the network for pQoS service is 80% of the total network bandwidth minus the cost of the all overhead, which may include all link control packets, reservation requests, admission controls, and probes. If Eq. (4) is true, then the NC node 506 admits the new pQoS flow to the network. If Eq. (4) is not true, then the NC node 506 rejects the flow request and returns the Available Flow Bandwidth (AFBW) as follows:

$$ARBW = 0.8[BW_{NC}(\text{total}) - C(\text{overhead})] - \sum_{j=1}^{M}\sum_{i=1}^{N} CF_i^j \qquad \text{Eq. (5)}$$

In order for the NC node to accept the new flow, the NodeCapacity for each of the ingress node 508 and egress node 510 must be greater than or equal to the cost of the existing flows and the new flow through that node. This condition is given by:

$$NodeCapacity(\max) \geq CF_{new} + CF_{node} = CF_{new} + \sum_{i=1}^{N} CF_i \qquad \text{Eq. (6)}$$

The remaining node capacity (REM_NODE_CAPACITY) is the difference between the left and right side of Eq. (6), and is one of the bandwidth-related criteria used by the NC node 506 before permitting a specific flow creation or update. Since the most basic bandwidth requirement for a pQoS flow is the number of time slots needed for one cycle (e.g., 1 ins) and simple mapping between a bandwidth value in number of Mbits/s and the number of time slots at the data link layer is not straightforward due to OFDM modulation and bitloading, a conversion is typically needed to determine the number of packets needed for the flow. To find the equivalent maximum number of packets in one data link cycle and the size (in bits) of each packet, the worst case bandwidth need of a flow at the data link layer per cycle is as follows:

$$QSpec\_PeakDataRate = MaxNumberofPackets \times QSpec\_MaxPacketSize \qquad \text{Eq. (7)}$$

Where,

QSpec_PeakDataRate and its conversion into time slots are the data link layer bandwidth reserved for the flow by the NC;

$$MaxNumberofPackets = \frac{TSpec\_PeakDataRate}{TSpec\_MinimumPacketSize};$$

QSpec_MaxPacketSize=TSpec_MaxPacketSize+EthernetPacketOverhead;

TSpec_PeakDataRate over 1 ms is calculated from TSpec_PeakDataRate with TimeUnit other than 1 ms.

The TimeUnit parameter allows the specification of token bucket TSpec XML of a live traffic source to match its traffic generation process. The TimeUnit parameter also provides a convenient and flexible way to extract token bucket TSpec XML from pre-recorded or legacy content regardless of whether the transport information is available. For example, for MPEG-coded video content without transport information, the PeakDataRate may be specified as the maximum number of bits within a video frame divided by the video frame duration. In this manner, the TimeUnit is the video frame interval determined by the video frame rate. If the media is PCM audio for example, the TimeUnit may be equal to the reciprocal of its sampling rate, For content that is furnished with transport information such as RTP, the resolution of the RTP timestamp, which has a default of 90 KHz, is usually used to specify TSpec XML. It is not unusual that the TimeUnit in the TSpec XML does not match the TimeUnit determined by the operational clock rate of an underlying link that is used to transport the traffic stream and a conversion of the token bucket TSpec XML specified in a different TimeUnit may be necessary.

From the definition of PeakDataRate in the token bucket model, at any interval [t1, t0], the maximum number of bits generated by a traffic source with characteristics of {r,b,p} may not exceed $p(t_1-t_0)$, for any $t_1-t_0 \geq TU_{TSPEC}$. Therefore, the maximum data rate, or PeakDataRate measured in any interval $[t_1-t_0]$, may not exceed $$\frac{p(t_1 - t_0)}{t_1 - t_0} = p.$$

Similarly, from the definition of MaximumBurstSize in the token bucket model, at any interval $[t_1-t_0]$, the maximum amount of bits generated by a traffic source with characteristics of {r,b,p} may not exceed $r(t_1-t_0)+b$, for any $t_1-t_0 \geq TU_{TSPEC}$. The maximum data rate, or PeakDataRate measured at any interval $[t_1-t_0]$ may not exceed $$\frac{r(t_1 - t_0) + b}{t_1 - t_0} = r + \frac{b}{t_1 - t_0}.$$

Therefore, combining both of the above constraints, the PeakDataRate measured at the operational clock rate $c_{oper}$ (denoted by $P_{oper}$) for any time unit of $TU_{oper}(>TU_{TSPEC})$ determined by operational clock rate $C_{oper}$, is given by:

$$p_{oper} = \min\left(p, r + \frac{b}{t_1 - t_0}\right) = \min\left(p, r + \frac{b}{TU_{oper}}\right) \min(p, r + b_{Coper}) \quad \text{Eq. (8)}$$

Parameterized QoS Flow Guarantee

The pQoS flow guarantee means that the pQoS-enabled network is able to support the flow provided that the CF does not exceed the available network bandwidth, This means that a new pQoS flow will not be admitted into the network unless the flow's peak data rate/nominal packet size ($N_{pps}$) can be supported at any given time. Note that either the ingress node 508 or the NC node 506 may permit a flow's ingress peak packet rate to instantaneously exceed the peak data rate/nominal data size that can be supported by the network.

In one embodiment, NC node 506 may guarantee that a portion of the total. network bandwidth is set aside for prioritized traffic and the remainder of the traffic is used for parameterized traffic. For example, NC node 506 may set aside 20% of the total network bandwidth for prioritized QoS traffic and the remaining 80% of the bandwidth is set aside for parameterized QoS traffic. Prioritized QoS traffic includes asynchronous stream traffic and asynchronous data traffic, Asynchronous stream traffic, for example a video stream, requires the knowledge of the average data rate of the stream. Accordingly, the QoS Manager 520 may request admission or obtain information about the availability of bandwidth for asynchronous stream traffic. If the prioritized bandwidth is not available due to heavy network loading, the stream will not be admitted and the ingress node 508 may then attempt to send the traffic as asynchronous data traffic. The QSpec for asynchronous stream traffic includes a service-type parameter and a maximum packet size parameter.

Asynchronous data traffic, for example a file transfer, is traffic for Which there is no required or predictable bandwidth. Asynchronous data traffic can also include best effort traffic, e.g., traffic that does not have a Virtual LAN (WAN) tag indicating its priority. In one embodiment, best effort traffic does not go through the admission process described below. Network control and flow management traffic are typically regarded as prioritized traffic. However, in certain applications where short and predictable latency are required, network control and flow management traffic may be structured to use the parameterized flow bandwidth (e.g., pull-mode DVR playback or DTCP localization constraint where the round-trip time of management exchange is limited to 7 ms). Alternatively, network control and flow management traffic may be treated as high-priority prioritized traffic. When treated as high-priority prioritized data traffic, the bandwidth set aside for the prioritized traffic should be larger than needed for network management and stream management traffic so that these management messages can be sent in a timely fashion.

When requesting bandwidth for a pQoS flow, all nodes may set the PRIORITY field in the data/control Reservation Request Element Frame to 0×3 as shown in Table 7 below. NC node 506 coordinates the scheduling of the flows within network 502. In one embodiment, the NC 506 coordinates the scheduling on a cycle-by-cycle basis where each cycle has a cycle time of approximately 1 millisecond. Note that the cycle time may vary from cycle to cycle. in each cycle, time slots are first allocated to the pQoS flows if data are available for transmission, and the remaining time slots are made available to prioritized or best-effort traffic. Three priority levels are supported at the network level: (1) high priority including network and stream management; (2) middle priority including asynchronous streams; and (3) low priority including asynchronous traffic without a priority tag, such as best effort traffic. Note that in some embodiments more or fewer priority levels may be implemented. When scheduling flows, NC node 506 schedules pQoS flows on a first-in first-out basis. In one embodiment, these pQoS flows are scheduled before any non-pQoS flows are scheduled.

TABLE 7

Data/Control Reservation Request Element Frame Format with Revised Priority Field

| Field | Length | Usage |
|---|---|---|
| FRAME_SUBTYPE | 4 bits | If FRAME_TYPE = Control<br>0x0 - Type I/III Probe Report<br>0x1 - Reserved<br>0x2 - Reserved<br>0x3 - Key distribution<br>0x4 - Dynamic Key distribution<br>0x5 - Type I/III Probe Report Request<br>0x6 - Link Acknowledgement<br>0x7 - Reserved<br>0x8 - Periodic Link Packet<br>0x9 - Power Control<br>0xA - Power Control Response<br>0xB - Power Control Acknowledgement<br>0xC - Power Control Update<br>0xD - Topology update<br>0xE - Unicast MAC Address Notification<br>0xF - Reserved<br>If FRAME_TYPE=Ethernet Transmission<br>0x0 = ETHERNET_PACKET |
| FRAME_TYPE | 4 bits | 0x2=Control<br>0x3=Ethernet Transmission |
| DESTINATION | 8 bits | Node ID of the destination node |
| PHY_PROFILE | 8 bits | Indicates the type of modulation scheme used for this transmission<br>bits 7:6<br>  00=profile sequence 0<br>  01=profile sequence 1<br>bits 5:0<br>  0x2=Diversity Mode profile<br>  0x7=Unicast profile<br>  0x8=Broadcast profile<br>All other values reserved. |
| REQUEST_ID | 8 bits | A sequence number associated with the request. |
| PARAMETERS | 12 bits | Reserved |
| PRIORITY | 4 bits | If FRAME_TYPE=Control<br>  0x0<br>If FRAME_TYPE=Ethernet Transmission<br>  0x0-Low Priority<br>  0x1-Medium Priority<br>  0x2-High Priority<br>  0x3-Parameterized Quality of Service flow |
| DURATION | 16 bits | Transmission time required in multiples of SLOT_TIME |

Some parameterized flows may be a variable hit rate (VBR) flows. Since the peak data rate of a VBR flow is larger than its average rate and a flow uses its average rate over a long period of time, a significant part of the parameterized flow bandwidth may not be used by the flow. To maximize bandwidth, the unused bandwidth of a VBR flow is made available to the asynchronous/prioritized traffic. Accordingly, the actual asynchronous bandwidth typically has two components: (1) a pre-set portion for asynchronous/prioritized traffic and (2) the reclaimed portion from the parameterized flow bandwidth.

Lease Time

To maximize network efficiency, applications may lease network bandwidth, e.g., time slots. The LeaseTime may be used in different way. For example, an application may use a large LeaseTime value to cover the entire length of a program. However, another application may use a much shorter LeaseTime value so that the network resources are released if the application is no longer in use. In one embodiment, the UPnP QoS layer creates and deletes, or tears down, pQoS flows in the network. In this embodiment, operators may set up permanent flows and the QoS Manager can locate unused pQoS flows through polling each node associated with a particular flow.

In other embodiments, Layer 2 keeps track of active flows through monitoring the LeaseTime of each pQoS flow. If the LeaseTime associated with a pQoS flow expires, the flow is torn down at Layer 2. At the device level, each device is responsible to manage the LeaseTime requested by the QoS Manager. In this embodiment, LeaseTime may be extended, if needed, by the QoS Manager. An Update Flow transaction, described in greater detail below, is used to indicate a new LeaseTime for a flow. At the network level, the NC tracks the reserved bandwidth of each network flow. If the LeaseTime of a flow expires, the NC node will release the network resources associated with the flow.

In some embodiments, Layer 2 technology may not use LeaseTime, but use a fixed virtual lease time, known as volatile reservation. With volatile reservation, a flow reservation automatically expires after a given period. However, the flow reservation may be periodically repeated to prevent an interruption of the flow.

In some embodiments, Layer 2 keeps track of active pQoS flows through monitoring the activity of each flow, and tears down a flow which is not active for a well-defined duration. Each packet of the flow serves to maintain the flow. If an application suspends a flow, e.g., a pause, and wants to maintain the node and network level resources, the application may generate packets strictly to maintain to the flow resources. These packets include a FlowId, but do not need to include a data body. Any intermediate nodes on the path of the flow and the NC will only release resources of the flow if the flow is inactive for more than InactivityInterval time. The InactivityInterval is a programmable parameter to enable different users and applications to adjust the values.

Parameterized QoS Flow Setup and Management

In one embodiment, any node connected to the network may act as an EN 504 and initiate a network transaction such as setting up a pQoS flow. Note that an EN 504 may request and setup a guaranteed pQoS flow and/or a non-guaranteed pQoS flow, such as a prioritized flow. For example, an Entry node may be running multiple upper-layer applications and each application may request bandwidth in the network. One application may request a guaranteed flow and another application may request a prioritized flow. Generally, to setup a pQoS flow, the QoS Manager 520 will receive the IP and MAC addresses for both the ingress node 508 and egress node 510 as well as the QoS Devices on the flow path from the QoS Device Service 518. The QoS Manager 520 queries a node to determine path information, quality of service capabilities, and network topology. When provided with this information from the QoS Device Service 518, the path of the pQoS flow is determined by the QoS Manager 520 using the TrafficId tuple {SourceIPAddress, SourcePort, DestinationAddress, DestinationPort, IpProtocol} information together with the information received from each QoS Device Service 518, e.g., information regarding the path information, quality of service capabilities, and network topology. The QoS Manager 520 determines the ingress and egress QoS Device Services 518 by comparing the IP addresses in the TrafficId for the ingress node 508 and egress node 510 with the IP addresses of all discovered QoS Device Services 518 discovered on the network 502, Using this information, the QoS Manager 520 locates the intermediate devices by looking up the MAC addresses corresponding to the ingress node 508 and the Destination IP address in the TrafficId. QoS Manager 520 also acquires the path information structure from each available QoS Device Service 518 and compares the MAC addresses of the ingress 508 and egress 510 nodes of the flow with the ReachableMAC value in the path information structure of every node until the path is found.

The QoS Manager 520 determines the topology elements of the network, e.g., a node's INTERFACE, LINK, TxDirection and RxDirection. A node's INTERFACE is the identifier associated with a node if a node has multiple network interfaces, e.g., a wireless interface and a coaxial network interface. A LINK is a network node that is not the ingress or egress node, but is associated with and transfers data for a flow. The INTERFACEId and TxDirection for the ingress node 508 are determined by comparing the IP address in the TrafficId with the IP address of all INTERFACEs on the ingress node 508. The INTERFACE with the matching address is the INTERFACE that is in use. Note that an INTERFACE's IP address may be identical to the node's IP address. The INTERFACEId and RxDirection for the egress node 510 is determined by comparing the destination IP address in the TrafficId to the IP address of all the INTERFACEs on the device to determine a match. The INTERFACE with the matching address is the INTERFACE that is in use. A Receiving LINK may be identified by comparing the MAC address of the ingress node 508 with the ReachableMAC address on each LINK of each INTERFACE. The LINK with the matching MAC address is then used as a Receiving LINK in an intermediate node. If a match cannot be located, then the node is not on the path of the data flow.

A Transmitting LINK is determined by comparing the MAC address of the egress node 510 to the Reachable MAC addresses on each LINK of each INTERFACE. The LINK with the matching MAC address is the used LINK, and the LINKId for this node is the MAC address of the node. If a match cannot be found, the node is not on the path of the flow. A node is on the path if two matches are found. The INTERFACEs used are determined by the matching LINKId. With the knowledge of the topological elements involved (INTERFACEId, LINKId, Rx/TxDirection), the capabilities of each node can be extracted from the nodes by querying for their service device capabilities.

In one embodiment, a pQoS flow is identified by a FlowID. The FlowID is used to manage a flow between an ingress node and one or more egress nodes by providing a unique identifier for each flow, At the data packet level the FlowID is the tuple {Packet_DA, UserPriority} and may be included in each data packet at the position of a regular IEEE 802.3 packet. In one embodiment, the Packet_DA (packet destination address) may be in the form of either a multicast MAC address or a unicast MAC address. When the FlowID is in the form of a multicast address, its value may be selected to uniquely identify each of a plurality of flows from the same ingress node at the network level. UserPriority is a priority value contained in a VLAN tag or a Differentiated Services Code Point (DSCP) to differentiate levels of pQoS flows. In one embodiment, the UserPriority is set to 4 or 5. The FlowID at the packet level may be used for data packet classification and service by the transmitting node, the receiving node, and any intermediate node in the path of the flow.

At the control/management or network level, the FlowID is defined as the tuple {FlowHandle, Packet_DA, UserPriority}. The FlowHandle is a number unique at the network level and is used to manage a flow between a transmitter and receiver(s) in a network. The FlowHandle does not need to be included in every data packet transmitted in the flow, but may be communicated to each node involved in the flow through a control or management message such that each node involved in the flow can uniquely identify the flow through control or management messages. The FlowHandle provides a unique identifier for each flow when Packet_DA is a unicast address and there is more than one flow going to the same destination (e.g., same Packet_DA), The FlowHandle enables transmitters to manage (e.g., setup/create, update or delete) a particular flow without affecting another flow going to the same egress node 510. In one embodiment, the FlowHandle is chosen to have the form of a multicast MAC address and is used to ensure that the Flown) tuple of a flow is unique at the network level. In one embodiment, the FlowHandle uses the MAC address of the ingress node 508, which limits the number of uniquely identifiable flows to 2, one with a priority of 4 and one with a priority of 5, with the unicast Packet_DA from the same ingress node 508.

Figure 7:
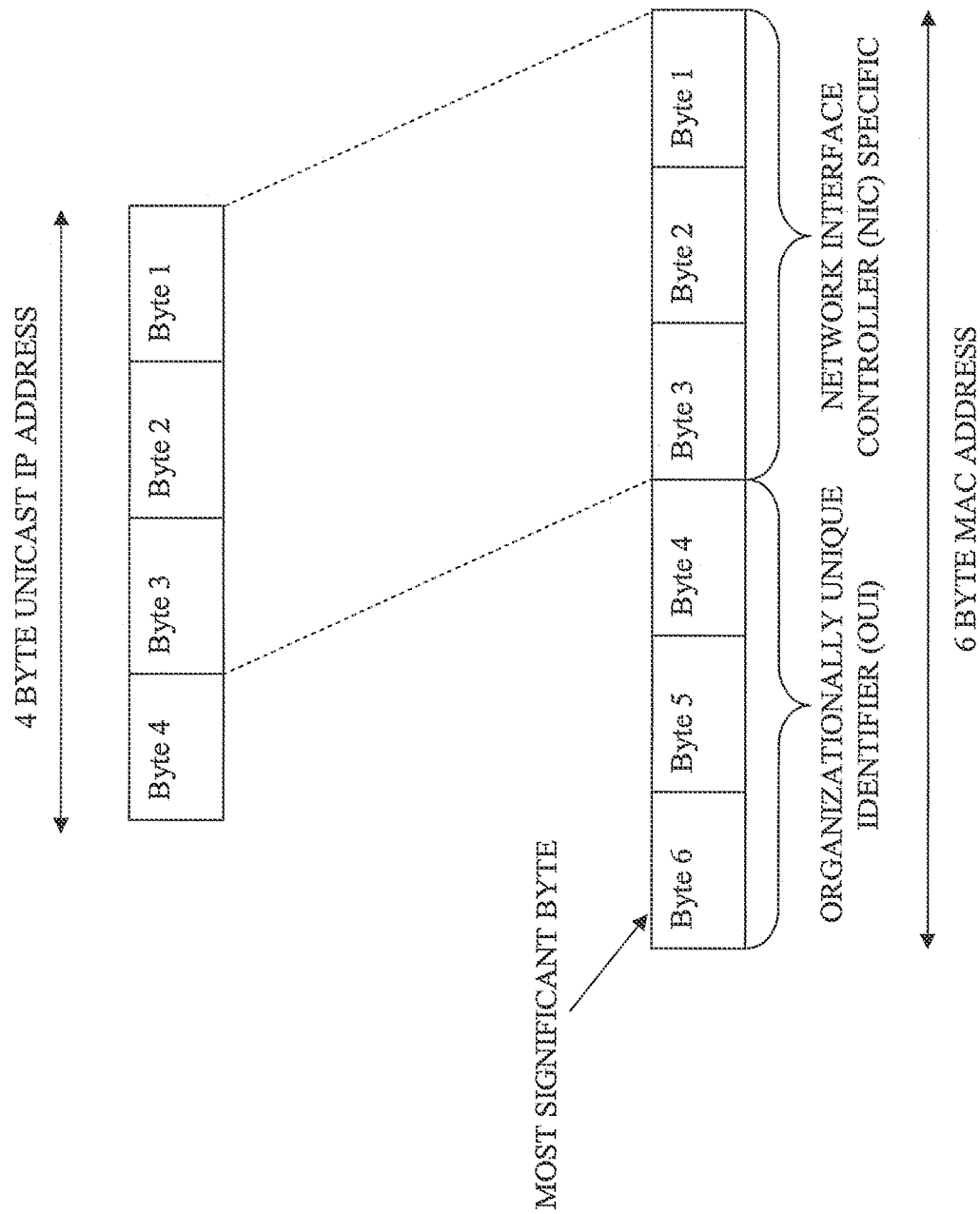
FIG. 7 illustrates one example of a six byte multicast Ethernet address.

In some embodiments, the unique FlowHandle may be generated in a different way. One example method of generating a FlowHandle in the form of a multicast MAC address from a unicast IP address is shown in FIG. 7. As shown in FIG. 7, to generate a FlowHandle in the form of a six byte multicast MAC address, a three byte Organizationally Unique Identifier (OUI) is used in the three most significant bytes of the six-byte MAC address. The three least significant bytes are Network Interface Controller (NIC) specific and are filled in using the three least significant bits of the unicast IP address.

In the instances when a pQoS flow may be rejected because FlowID at the network level already exists at the network level, the Entry node 504 will increment the FlowHandle by a predetermined value and retry creating the flow. For example, if the calculated FlowHandle 01-00-5E-4D-62-B1 already exists in the network, then EN 504 may increment the address by 0x100, e.g., 01-00-5E-4D-63-B1, and retry creating the pQoS flow. The EN 504 may continue to increment the address until the FlowID is unique at the network level. In some embodiments, EN 504 may increment other fields of the FlowID at the network level, for example, the user priority field or the packet destination address.

Figure 8:
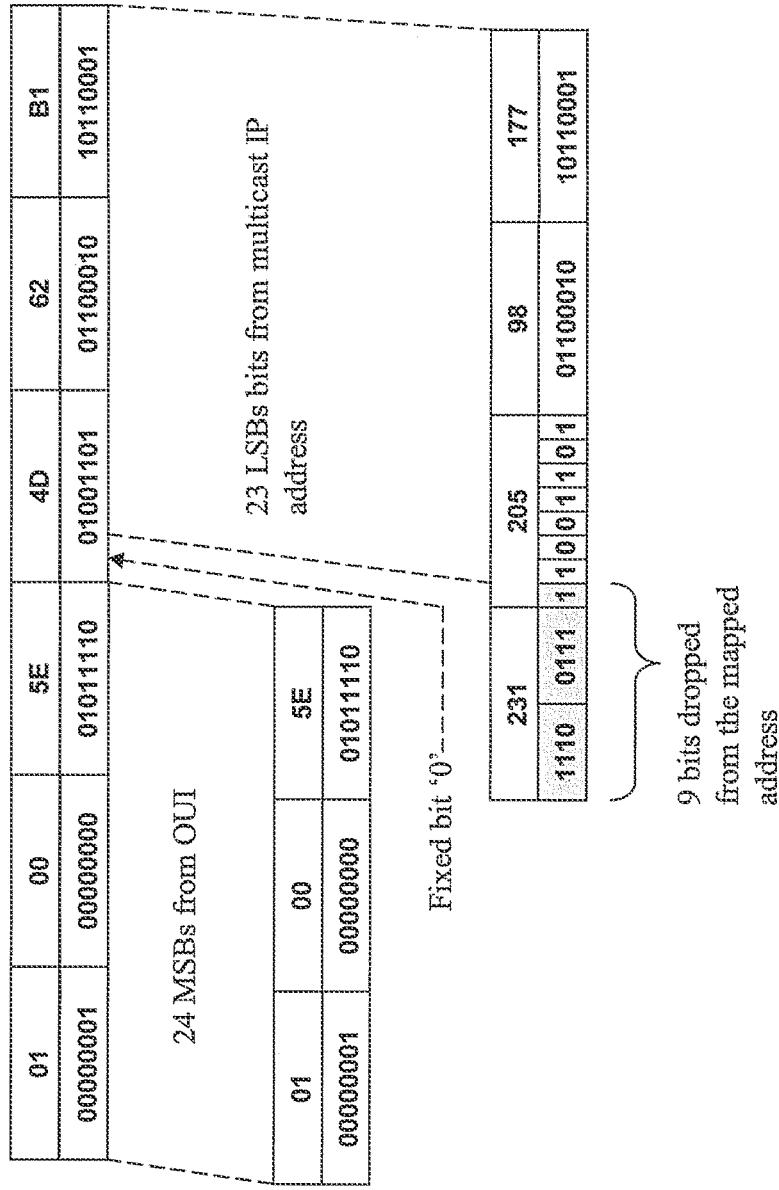
FIG. 8 illustrates one example of mapping an IP multicast address to a MAC multicast address.

In embodiments where the intended destination of a pQoS flow is a multicast IP group, an IP multicast address may be mapped to a multicast MAC address. With reference to FIG. 8, one example of a method for mapping an IP multicast address to a MAC multicast address is now described. To create a 48-bit MAC multicast address, the top 24 bits are filled in using the multicast (01-00-5E in FIG. 8). The 25th bit is fixed at '0' and the bottom 23 bits of the multicast IP address are placed in the bottom 23 bits of the MAC address. Accordingly, the 9 most significant bits (MSB) of the multicast IP address are dropped in mapping the IP address to the MAC address.

Figure 9:
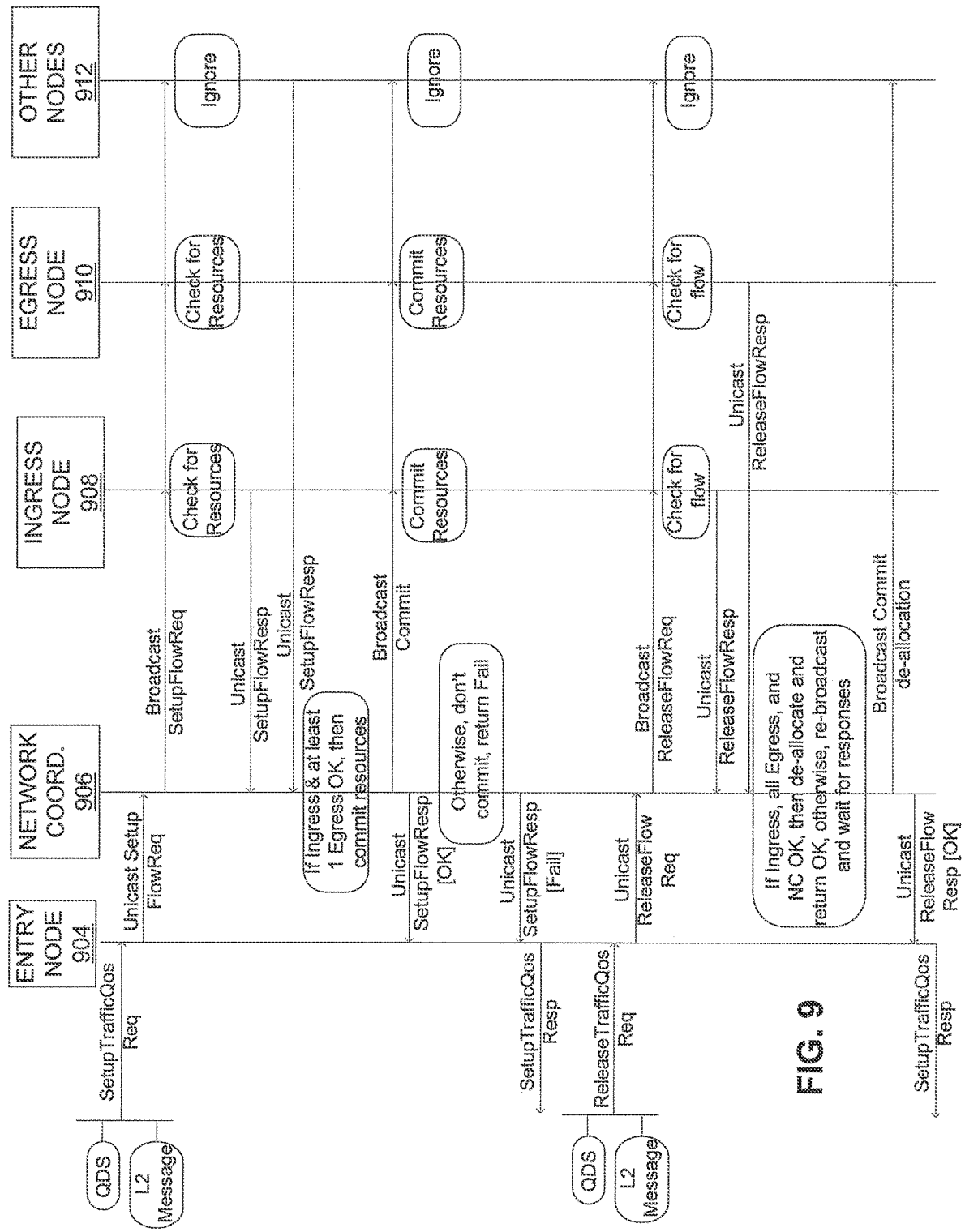
FIG. 9 is a illustrates one example of a flow management process in a network.

With reference to FIG. 9, one example of flow management, such as a flow setup/create, update, or delete, is now described. In a TWO or similar environment, the QoS Device Service (not shown) of an EN 904 invokes the L2ME of the node to send a request to perform flow management to the NC 906. NC 906 will broadcast a request to all network nodes 908, 910, 912 and wait for a corresponding response from at least the ingress 908 and egress 910 nodes. The ingress node 908 will use TSpec XML to calculate the number of time slots needed to setup or update the flow as well as the resources needed at the node level (e.g., system bus bandwidth and memory). If the ingress node 906 can support the flow, then it will send a response to the NC 908 indicating that it can support the flow and the number of time slots needed for the flow. If the ingress node 908 cannot support the flow, the response will indicate that it cannot support the flow and identify the available bandwidth in Mbits/s at the ingress node 908. Each egress node 910 will also determine, in a manner similar to that of the ingress node 908, if it can support the flow or not and send a corresponding message to the NC 906.

The NC 906 will use its responses to determine if the flow setup or update is supported in the network. If the ingress node 908 and at least one egress node 910 report that the flow update is supported, then the NC 910 will determine if the number of time slots necessary to setup or update the flow. If the number of time slots required to setup or update the flow is available in the network, NC 906 will broadcast a message to all network nodes to allocate the resources. If either the ingress node 908 and/or all of the egress nodes 910 cannot support the flow setup or update, NC 906 will not allocate resources and will report the maximum available bandwidth to EN 904.

Releasing a flow in a network may be initiated by an EN 904 transmitting a request to release or delete an existing flow to the NC 906. NC 906 will broadcast a message to all network nodes 908, 910, 912 requesting each node to release resources associated with the pQoS flow. NC node 906 will wait to receive a response from at least the ingress 908 and egress 910 nodes, If the flow was previously released, or does not exist in the network, the ingress 908 and/or egress 910 may transmit a response to the NC 906 indicating that the flow does not exist. If the flow does exist, the ingress node 908 and egress node 910 will report back to the NC 906 at which time the NC will broadcast a message to all network nodes 908, 910, 912 to release the flows. Upon receiving the message from the NC 906, the nodes will release the resources associated with the pQoS flow. Nodes that are not involved with a setup or update or delete flow may simply ignore all received messages.

Proxied Parameterized QoS Flow Management

Figure 11:
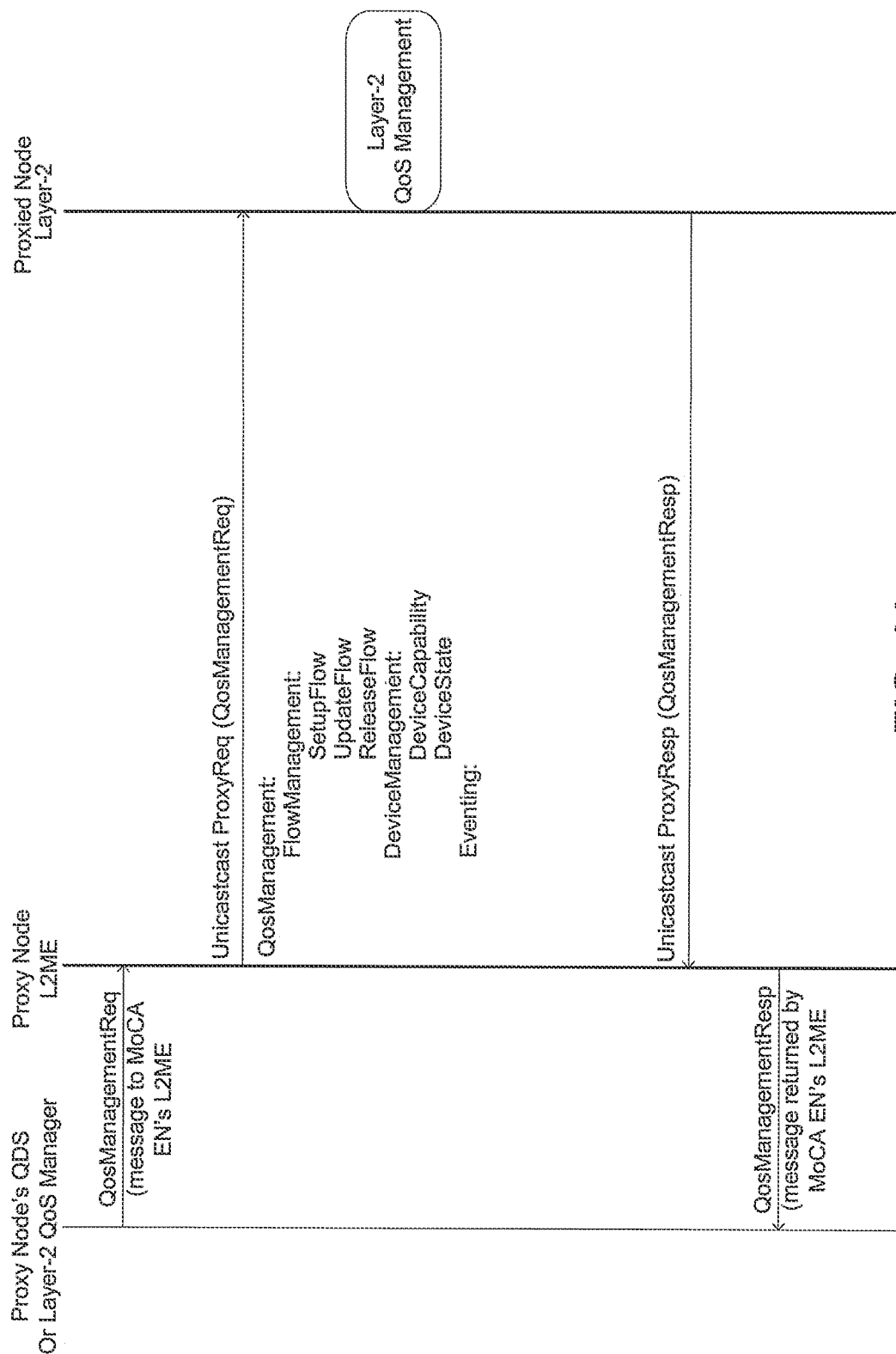
FIG. 11 illustrates one example of a proxied flow management process in a network.

A network node configured with an L2ME, but without an upper layer application ("Layer-2-only node"), can be proxied by a UPnP QoS-enabled node or any node with an L2ME that can pass pQoS Management messages between the QoS Manager and the Layer 2-only node. Additionally, a node may be proxied by a second node through a Layer-2 bridging technique, such as, but not limited to, IEEE802.1 including IEEE802.1D, IEEE802.1Q, IEEE802.1Qat, and IEEE-802.1Qav. Proxying enables the QoS Manager to perform QoS Management on a Layer-2-only node. One example of a proxy process is shown in FIG. 11. The role of the proxy is simply to pass pQoS Management Request, Response, and Event messages without modifying the contents of these messages. In one embodiment, the pQoS management messages are classified into three categories, which are as follows:

1. Flow Management messages including SetupFlow, UpdateFlow, and ReleaseFlow;

2: Device Management messages including DeviceCapability and DeviceState; and

3. Eventing messages where a Layer 2-only node generates Layer 2 events to the QoS Manager.

Figure 10:
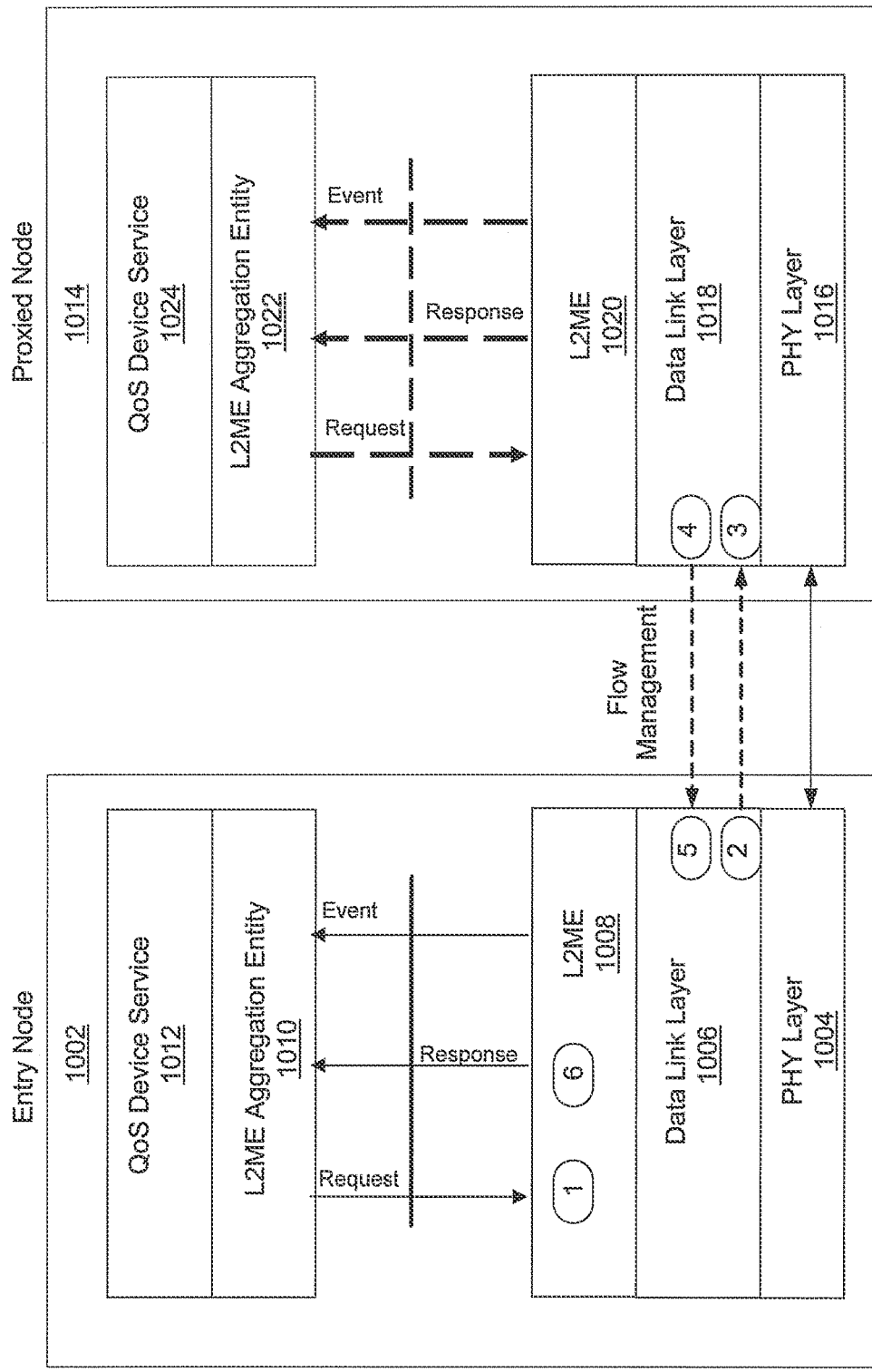
FIG. 10 illustrates one example of a system embodiment of a proxy.

Additionally, a QoS Device Service may proxy another QoS Device Service, so that the QoS Manager may perform all pQoS management operations while only communicating with one pQoS Device. As shown in FIG. 10, the EN 1002, which is also the proxy node, includes a PHY layer 1004, Data Link layer 1006, and an L2ME 1008. L2ME 1008 is configured to communicate with QoS Device Service 1012 through L2ME Aggregation Entity 1010. Proxied node 1014 also includes a PHY layer 1016, a Data Link layer 1018, and an L2ME 1020. L2ME 1020 of proxied node 1014 communicates with a QoS Device Service 1024 through L2ME Aggregation Entity 1022. An L2ME Aggregation Entity 1022 may be implemented when a node has multiple network interfaces, such as, for example, a wireless interface and a MoCA interface.

The proxy process begins with the L2ME 1008 of proxy node 1002 receiving a request from the QoS Device Service 1012. In this request, the L2ME Aggregation. Entity 1012 requests the static proxy capabilities of the INTERFACE. The L2ME of an INTERFACE/node may be able to proxy some or all other nodes connected to a network. L2ME 1008 generates a Request L2ME message and sends the message to proxied node 1014. Note that although FIG. 10 only shows one node being proxied, in other embodiments multiple nodes may be proxied. The Request L2ME message typically includes a request to perform network or flow management, device management, or to determine if a network event has occurred. For example, a node may be proxied to create/setup, update, or delete a pQoS flow in a network or o determine the capabilities of one or all devices connected to the network, such as, for example, the maximum transmission rates (bits/s), the ability of a node to perform parameterized or prioritized quality of service.

Upon receiving the Request L2ME message, proxied node 1014 generates an appropriate Response L2ME Frame and transmits the message back to proxy node 1002. L2ME 1008 in proxy node 1002 forwards an appropriate response to the L2ME Aggregation Entity 1010, which may then pass the message to the QoS Device Service 1012. Through this process, a node outside of the network may gain access to, or even manage, the network.

Parameterized QoS Transactions

Embodiments will now be described as being implemented with the L2ME protocol. Note that in other embodiments, network transactions may be performed implementing other protocols. In the embodiment illustrated in FIG. 5, pQoS transactions may be initiated by either the NC node 506 or by an Entry node 504. EN-initiated transactions typically comprise two pQoS Waves and are usually initiated with a Submit message being sent unicast to the NC node 506. Note that although pQoS transactions are described using L2ME protocol, other implementations may be used to perform the network transactions. The Submit message transmitted from EN 504 may be a consequence from a message received from another pQoS segment outside of network 502, from an upper-layer application at EN 504 or from another node connected. Upon receipt of the Submit message, NC node 506 typically starts the first Wave by broadcasting a Request message to all network nodes 504, 508, 510 asking for specific pQoS flow information to be returned. In the second Wave, NC node 506 typically broadcasts the information received from the Responses from the network nodes in the first Wave.

In contrast, pQoS transactions initiated by NC node 506 typically comprise only a single pQoS Wave. The pQoS Wave is initiated by NC node 506 broadcasting a Request message to all the nodes 504, 508, 510 requesting a specific action to take place. The Wave is completed when a Response is received by the NC node 506 from each of the requested network nodes 504, 508, 510.

Each of the supported pQoS flows may be transmitted either in a unicast, multicast, or broadcast flow. Note that multicast flows within some networks are handled as broadcast flows where the egress node ID is 0x3f. A broadcast flow is a pQoS flow transmitted to all the network nodes in the network. NC node 506 may delete a unicast flow if the ingress node 508 or egress node 510 is disconnected from the network 502. In contrast, broadcast flows are usually not deleted for network topology reasons, except for When an ingress node 508 is disconnected from the network.

Create and Update Parameterized QoS Flow Transactions

Figure 12:
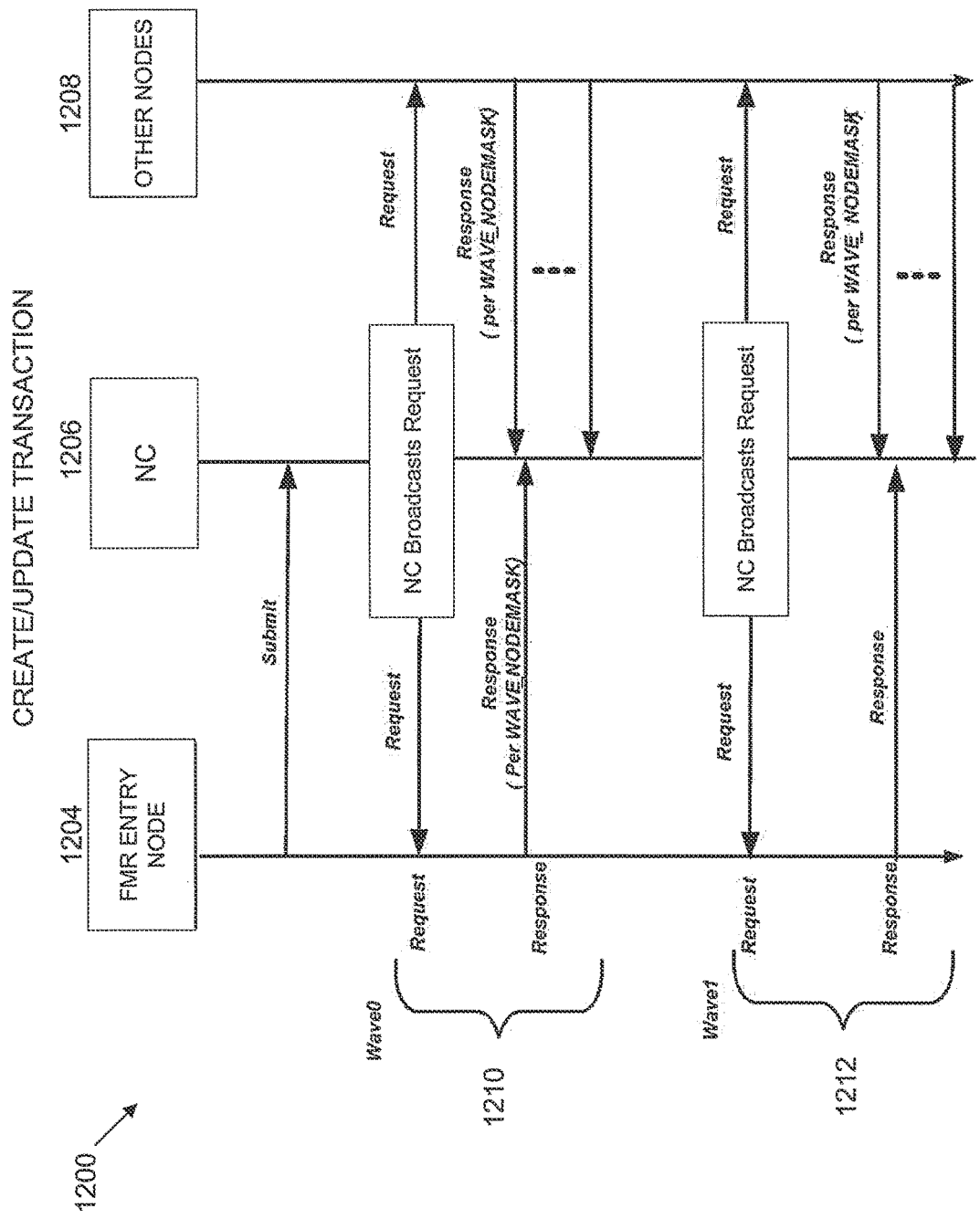
FIG. 12 is a diagram showing one example of a Create/Update transaction in accordance with the embodiment of FIG. 5.

FIG. 12 illustrates an example pQoS Create/Update transaction in accordance with the L2ME protocol. Note that although pQoS transactions are described using L2ME protocol, other implementations may be used to perform the network transactions. The purpose of a Create or Update transaction is to create a new pQoS flow or update the pQoS flow attributes between the ingress node 508 and egress node 510 as shown in FIG. 5.

In one embodiment, a pQoS transaction is initiated when the NC node 506 receives a Submit message from an EN 1204. Note that EN 1204 may send the Submit message in response to an upper layer application such as the QoS Device Service 518 (shown in FIG. 5) or upon receiving a message from another node outside the QoS segment. After receiving the Submit message from EN 1204, NC node 1206 transmits a Request message to all nodes 1204, 1208 connected. to the network thereby starting the first wave (Wave 0) 1210. The first wave 1210 is used to inform all the network nodes 1204, 1208 about the proposed pQoS flow Create or Update operation and collect metrics about current flow allocations from the nodes.

TABLE 8

Submit L2ME Header and Payload Format for Create/Update

| Field | Length | Usage |
|---|---|---|
| L2ME SUBMIT Header for CREATE and UPDATE | | |
| HDR_FMT | 8 bits | |
| ENTRY_NODE_ID | 8 bits | The ID of the Entry node initiating this transaction |
| ENTRY_INDEX | 8 bits | |
| RESERVED | 8 bits | |
| VENDOR_ID | 8 bits | 0=MoCA |
| TRANS_TYPE | 8 bits | 1=pQoS |
| TRANS_SUBTYPE | 8 bits | 1: Create; 2: Update |
| WAVE_NODEMASK | 32 bits | All nodes in the network |
| MSG_PRIORITY | 8 bits | 240 |
| TXN_LAST_WAVE_NUM | 8 bits | 2 |
| RESERVED | 8 bits | 0x0; Type III |
| Submit Payload for Create and Update | | |
| FLOW_ID | 48 bits | pQoS flow L2 ID |
| RESERVED | 16 bits | 0x0; Type III |
| RESERVED | 24 bits | 0x0; Type III |
| INGRESS_NODE_ID | 8 bits | If TRANS_SUBTYPE=1, Node ID for the ingress of the flow; otherwise ignore |
| RESERVED | 24 bits | 0x0; Type III |
| EGRESS_NODE_ID | 8 bits | If TRANS_SUBTYPE=1, Node ID for egress of unicast flow or 0x3f is for a broadcast flow; otherwise ignore |
| L2ME_DATA | 32 bits | Application specific defined content- optional field for sending node and mandatory for receiving node for up layer. |
| RESERVED | 64 bits | Type III |
| TV ENTRIES (up to 3 entries) | | |
| For (i=0; i<N; i++){ | | N=number of TV entries |
| TAG NAME | 8 bits | Tags are defined in |
| TAG VALUE | 24 bits | Value associated with tag |
| } | | |

The tag-value (TV) field has of up to 24 different pQoS entries. Each pQoS TV entry comprises an 8-bit tag field followed by a 24-bit tag value field. Table 9 shows an example of a list of pQoS tags for the TV entries. Note that tag "0" indicates the current TV and any following TV entries can be ignored. PEAK_DATA_RATE values outside the range may be interpreted as a special case to query the available bandwidth without creating the flow. The LEASE_TIME field indicates the duration after which the ingress node 508 (shown in FIG. 5) may stop treating the associated traffic as a pQoS flow and release the resources associated with the flow.

TABLE 9

Defined Tags for TV entries

| TAG Name | Tag # | Tag Value Description |
|---|---|---|
| END OF TV LIST | 0 | ignored |
| PEAK_DATA_RATE | 2 | 0 - 0xFFFFFE; Peak data rate (kb/s) 0xFFFFFF=only for query and no pQoS flow is created or updated; |
| NOM_PACKET_SIZE | 9 | Nominal packet size (bytes) - Required; see |
| LEASE_TIME | 20 | Lease time (seconds) - Optional (default=0; permanent) |

TABLE 9-continued

Defined Tags for TV entries

| TAG Name | Tag # | Tag Value Description |
|---|---|---|
| RESERVED | All others | Reserved for future use; MoCA-1.1 node ignore |

Upon receiving the Request L2ME message, ingress node 508 and egress node 510 (both shown in FIG. 5) use the TSpec XML value to calculate the time slots needed for the flow as well as the resources needed from each node, such as system bus bandwidth and memory. Each requested node responds to the NC node 1206 with a Response L2ME Frame indicating the aggregated costs of existing pQoS flows and completing the first L2ME Wave. Note that if a node receives the Request L2ME Frame and is not involved in the flow, it may simply ignore the message. One example of a Response message format for Create/Update operations is specified in Table 10 below. Note that if NC node 1206 does not receive a Response L2ME Frame from the ingress node 508 or the egress node 510 within a given time interval, then NC node 1206 will rebroadcast the Request L2ME message up to a number of times, e.g., three times, before treating the message as failed.

TABLE 10

Response L2ME Message Format for Create/Update (Wave 0)

| Field | Length | Usage |
|---|---|---|
| *Response L2ME Header for Create/Update* | | |
| HDR_FMT | 8 bits | 0x8 |
| RESP_STATUS | 8 bits | Bits 7:4 - reserved Type III<br>Bit 3: DO_ENTRY_<br>Bit 2: IN_NEXT_WAVE - set to '1' if the node is ingress for the flow; otherwise=implementation specific<br>Bit 1: reserved Type III<br>Bit 0: INTERPRETED - '1' |
| RESERVED | 8 bits | Type III |
| WAVE_SEQ_N | 8 bits | Copied from initiating Request |
| RESERVED | 32 bits | Type III |
| *Response L2ME Payload for Create/Update* | | |
| RESERVED | 8 bits | Type III |
| VETO_CODE | 8 bits | As defined in Table 11 |
| RESERVED | 16 bits | Type III |
| EXISTING_TPS | 32 bits | Duration in multiple of SLOT_TIME/second of the set of existing flows for which this node is an ingress node |
| EXISTING_PPS | 32 bits | Packets/second of the set of existing flows for which this node is the ingress node |
| COST_TPP | 32 bits | Ingress node's cost of new or updated flow (multiple of SLOT_TIME/packet); If not an ingress node set to "0" |
| REM_NODE_CAPACITY | 32 bits | For the requested flow's nominal packet size, the peak data rate (kb/s) that this node can commit to this flow. This value may be may be more or less than the requested peak data rate. If this node is not ingress or egress node, set to 0xFFFFFFFF |

Each requested node 1204, 1208 generates the Response L2ME Frame payload by calculating the EXISTING_TPS value for all the existing flows excluding the new or updated flow in which the node is an ingress node. This value is calculated by using Eq. (1) for each flow. The nodes 1204, 1208 also calculate the EXISTING_PPS value for all the existing flows excluding the new or updated flow. The EXISTING_PPS value is the sum of the peak data rate/nominal packet size for each flow. Additionally, the nodes 1204, 1208 calculate the COST TPS value as the cost of the new or updated flow in SLOT_TIME/second according to Eq. (1). Values for PEAK_DATA_RATE=0 are excluded. If there are ingress or egress node limits on the flow throughput (bits/second), the nodes 1204, 1208 calculate the remaining node capacity in bits/second (REM_NODE_CAPACITY) and identify the reason using the VETO_CODE field (node's capacity definition). One example of a format of the Response L2ME Frame for Wave 1 is shown in Table 15 below.

There are several scenarios in which a node may be unable to fulfill the Request issued by NC node 1206. In these cases, the node issues a VETO_CODE, one example list of VETO_CODEs is shown in Table 11 below. INVALID_TV is issued if one or more of the following statements are TRUE about the TV set as received by NC node 1206:

1. PEAK_DATA_RATE is not present.
2. NOM_PACKET_SIZE is not present.
3. NOM_PACKET value <64 B or >1518 B

TABLE 11

List of Acceptable VETO Code Values

| VETO CODE NAME | Value | Description |
|---|---|---|
| VETO_CODE_INGRESS_OK | 1 | Node is the Ingress node (both Create & Update flows) |
| VETO_CODE_NONINGRESS_OK | 2 | Node is not the ingress node and does not forbid flow creation or update |
| VETO_CODE_FLOW_EXISTS | 3 | Flow is already exist on the node - node veto the creation of the same flow (only for Create flows) |
| VETO_CODE_INSUF_INGR_BW | 4 | Ingress node has bandwidth limitation, preventing a flow from being created as specified (both Create & Update flows) |
| VETO_CODE_INSUF_EGR_BW | 5 | Reserved |
| VETO_CODE_TOO_MANY_FLOWS | 6 | Node has already too many existing flows -(only for Update flow) |

TABLE 11-continued

List of Acceptable VETO Code Values

| VETO CODE NAME | Value | Description |
| --- | --- | --- |
| VETO_CODE_INVALID_FLOW_ID | 7 | The requested flow ID is not usable as a Quality of Service flow ID by the ingress node - (Only for Create flows) |
| VETO_CODE_INVALID_TV | 8 | |
| VETO_CODE_INVALID_NODE_ID | 9 | Node ID became invalid during network operation both |
| VETO_CODE_LEASED_EXPIRED | 10 | Update only |

Before the NC node 1206 may initiate the second wave (Wave 1) 1212, it needs to determine if the outcome of the Create or Update transaction is either (1) denied because a node provided non-bandwidth-related reasons for the requested flow, (2) denied because of bandwidth limitation, or (3) allowed to commit flow resources as requested.

TABLE 12

Non-Bandwidth-Related VETO Codes and Rollback Reasons

| VETO CODE NAME | Non-Bandwidth ROLLBACK_REASON NAME |
| --- | --- |
| VETO_CODE_FLOW_EXISTS | ROLLBACK_REASON_FLOW_EXISTS |
| VETO_CODE_TOO_MANY_FLOWS | ROLLBACK_REASON_TOO_MANY_FLOWS |
| VETO_CODE_INVALID_FLOW_ID | ROLLBACK_REASON_INVALID_FLOW_ID |
| VETO_CODE_INVALID_TV | ROLLBACK-REASON_INVALID_TV |
| VETO_CODE_INVALID_NODE_ID | ROLLBACK_REASON_INVALID_NODE_ID |
| VETO_CODE_LEASE_EXPIRED | ROLLBACK_REASON_LEASE_EXPIRED |

If any node returns one of the VETO_CODEs listed in Table 12 above, then the Request for Wave 1 contains the corresponding ROLLBACK_REASON. If one node does not return VETO_CODE_INGRESS_OK, then the REQUEST for Wave 1 contains ROLLBACK_REASON_FLOW_NOT_FOUND as shown in Table 14 below.

NC node 1206 evaluates and ensures the following three bandwidth-related criteria are met before permitting a specific flow Create or Update:

1. Aggregated TPS—the sum of EXISTING_TPS and COST_TPS values from all nodes may be less than QUALITY OF SERVICE_TPS_MAX.

2. Aggregated PPS—the sum of EXISTING_PPS and $N_{pps}$ values from all nodes may be less than QUALITY OF SERVICE_PPS_MAX.

3. Ingress or egress node capacity—the returned REM_NODE_CAPACITY value at the ingress or egress nodes may be greater than or equal to the requested flow PEAK_DATA_RATE.

If NC node 1206 determines that the requested flow resources may be committed for a Create or Update transaction, it may send a Request L2ME Frame with header, shown in Table 2 above, with a zero-length payload to the participating nodes in Wave 1 to commit the requested resources.

If any one of these bandwidth-related criteria fails, then NC node 1206 may calculate the MAX_PEAK_DATA_RATE (THRESHOLD_BPS) value in the payload of the Request Frame. The MAX_PEAK_DATA_RATE is the maximum allowable flow PEAK_DATA_RATE (bits/second) that would have succeeded. NC node 1206 may also specify the most limiting criteria by selecting one of the following ROLLBACK_REASONs:

1. ROLLBACK_REASON_INSUF_LING_BW,
2. ROLLBACK_REASON_INSUF_EGR_BW,
3. ROLLBACK_REASON_INSUF_AGGR_BW
4. ROLLBACK_REASON_INSUF_AGGR_PPS

The second wave 1212 informs the nodes about the decision of the flow Create or Update operation, If the Create or Update operations failed in the first wave 1210, NC node 1206 may send the Request L2ME Frame for the second wave 1212 according to Table 13 below where THRESOLD_BPS value is only defined for the four above ROLLBACK_REASONs, Note that if an Update operation fails, the existing parameterized QoS flow still persists with its current TSpec XML parameters.

TABLE 13

Request L2ME Frame Payload for Failed Create/Update (Wave 1)

| Field | Length | Usage |
| --- | --- | --- |
| Request Header for Create/Update (Wave 1) | | |
| HDR_FMT | 8 bits | |
| ENTRY_NODE_ID | 8 bits | |
| ENTRY_INDEX | 8 bits | |
| RESERVED | 8 bits | 0; Type III |
| VENDOR_ID | 8 bits | 0 |
| TRANS_TYPE | 8 bits | 1=QOS |
| TRANS_SUBTYPE | 8 bits | 1: Create; 2: Update |

TABLE 13-continued

Request L2ME Frame Payload for Failed Create/Update (Wave 1)

| Field | Length | Usage |
| --- | --- | --- |
| WAVE_NODEMASK | 32 bits | |
| CYCLE_NODEMASK | 32 bits | |
| WAVE_STATUS | 8 bits | 0x0 |
| DIR_LEN | 8 bits | Ignore |
| TXN_SEQ_N | 8 bits | |
| TXN_WAVE_N | 8 bits | 1 |
| Request Payload for Create/Update | | |
| ROLLBACK_REASON | 8 bits | ROLLBACK_REASON for failed operation |
| BW LIMIT INFO | 8 bits | Bits 7:4 - reserved Type III<br>Bit 3: INSUF_ING_BW - set to "1" if insufficient ingress node bandwidth<br>Bit 2: INSUF_ENG_BW - set to "1" if insufficient egress node bandwidth<br>Bit 1: INSUF_AGGR_TPS - set to "1" if aggregate TPS is limited<br>Bit 0: INSUF_ING_PPS - set to "1" if aggregate TPS is limited |
| RESERVED | 16 bits | 0x0; Type III |
| MAX_PEAK_DATA_RATE | 32 bits | Maximum allowable flow peak data rate (bits/second) to create or update this flow. |

TABLE 14

List of acceptable ROLLBACK_REASON Values

| ROLLBACK_REASON NAME | Value | Description |
| --- | --- | --- |
| ROLLBACK_REASON_FLOW_EXISTS | 3 | CREATE operation failed due to a node already acting as ingress for the specified flow |
| ROLLBACK_REASON_INSUF_INGR_BW | 4 | Flow can't be created due to insufficient bandwidth on ingress node data path; NC provides the maximum feasible data bandwidth |
| ROLLBACK_REASON_INSUF_EGR_BW | 5 | Flow can't be created due to insufficient bandwidth on egress node data path; NC provides the maximum feasible data bandwidth |
| ROLLBACK_REASON_TOO_MANY_FLOWS | 6 | Ingress or egress nodes are unable to add the flow |
| ROLLBACK_REASON_INVALID_FLOW_ID | 7 | The requested flow ID is reserved by the node |
| ROLLBACK_REASON_INVALID_TV | 8 | Node can't accept the received TV |
| ROLLBACK_REASON_INVALID_NODE_ID | 9 | Node ID became invalid during network operation |
| ROLLBACK_REASON_LEASE_EXPIRED | 10 | Update operation failed due to flow being deleted from the network |
| ROLLBACK_REASON_FLOW_NOT_FOUND | 16 | Update operation failed |
| ROLLBACK_REASON_INSUF_AGGR_TPS | 17 | Insufficient flow bandwidth on the MoCA ™ network |
| ROLLBACK_REASON_INSUF_AGGR_PPS | 18 | Insufficient packets/second on the MoCA ™ network |

Upon receiving a zero-length Request for a successful Create operation in the second wave 1212, the ingress node 504 (shown in FIG. 5) for the flow may commit the requested resources. Each node 1204, 1208 may respond with a Response message format, one example of which is shown below in Table 15.

TABLE 15

Response L2ME Message Format for Create/Update (Wave 1)

| Field | Length | Usage |
|---|---|---|
| Response L2ME Header for Create/Update (Wave 1) | | |
| HDR_FMT | 8 bits | |
| RESP_STATUS | 8 bits | Bits 7:4 - reserved Type III<br>Bit 3: DO_ENTRY_CANCEL - '0'<br>Bit 2: IN_NEXT_WAVE - See<br>Bit 1: reserved Type III<br>Bit 0: INTERPRETED - '1' |
| RESERVED | 8 bits | Type III |
| WAVE_SEQ_N | 8 bits | Copied from initiating Request |
| RESERVED | 32 bits | Type III |
| Response L2ME Payload for CREATE/UPDATE | | |
| RESERVED | 32 bits | 0; Type III |

Delete Parameterized Quality of Service Flow Transaction

Figure 13:
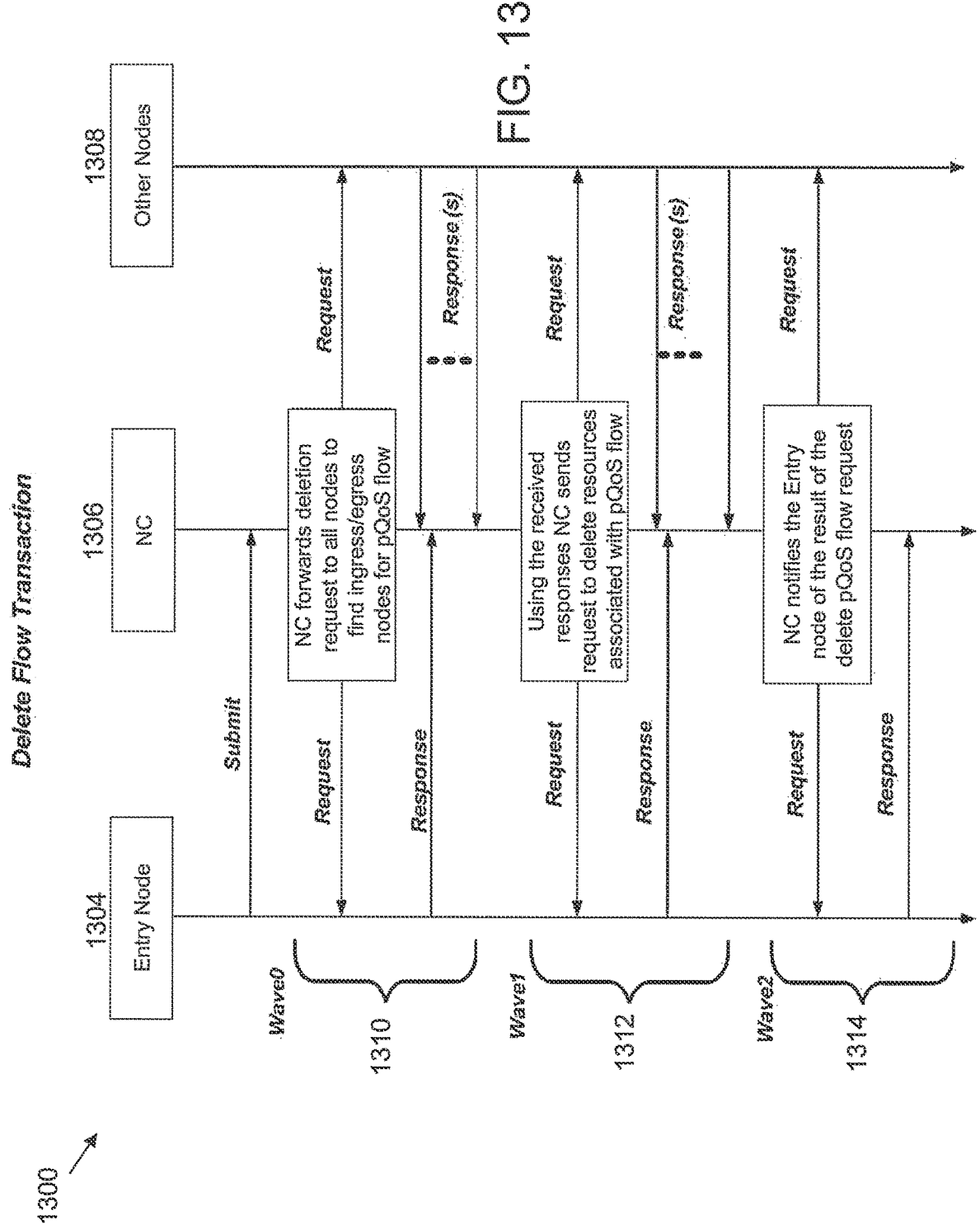
FIG. 13 is a diagram showing one example of a Delete transaction in accordance with the embodiment of FIG. 5.

The purpose of Delete Quality of Service flow transaction is to teardown specific pQoS flow between a set of ingress 508 and egress 510 nodes (shown in FIG. 5). With reference to FIG. 13, one example of a Delete pQoS transaction 1300 in accordance with the embodiment shown in FIG. 5 is now described. The Delete pQoS flow transaction 1300 comprises three L2ME Waves 1310, 1312, 1314. The transaction starts when EN 1304 sends a Submit message to the NC node 1306 specifying the flow ID to be deleted. One example of a Delete message format is shown below in Table 16.

TABLE 16

Submit L2ME Message Format for Delete Operation

| Field | Length | Usage |
|---|---|---|
| L2ME SUBMIT Header for DELETE | | |
| HDR_FMT | 8 bits | |
| ENTRY_NODE_ID | 8 bits | The ID of the Entry node initiating this transaction |
| ENTRY_INDEX | 8 bits | |
| RESERVED | 8 bits | 0; Type III |
| VENDOR_ID | 16 bits | 0 |
| TRANS_TYPE | 8 bits | 1=QOS |
| TRANS_SUBTYPE | 8 bits | 3: Delete |
| WAVE_NODEMASK | 32 bits | All QoS Capable Nodes |
| MSG_PRIORITY | 8 bits | 240 |
| TXN_LAST_WAVE_NUM | 8 bits | 2 |
| RESERVED | 8 bits | 0x0; Type III |
| Submit Payload for Delete | | |
| FLOW_ID | 48 bits | QoS flow L2 identification number |
| RESERVED | 16 bits | 0x0; Type III |
| RESERVED | 32 bits | 0x0; Type III |

The first wave (Wave 0) 1310 of the Delete transaction 1300 informs all network nodes 1304, 1308 about which pQoS flow and resources are to be deleted. NC node 1306 initiates the first wave 1310 using a Request message format based on the Submit message to all the nodes 1304, 1308. The nodes 1304, 1308 may respond with a Response message, indicating if they have the resources associated with the flow to be deleted.

TABLE 17

Response L2ME Header and Payload for Delete (Wave 0)

| Field | Length | Usage |
|---|---|---|
| Response L2ME Header for Delete (Wave 0) | | |
| HDR_FMT | 8 bits | |
| RESP_STATUS | 8 bits | Bits 7:4 - reserved Type III<br>Bit 3: DO_ENTRY_CANCEL -<br>Bit 2: IN_NEXT_WAVE - set to '1' if the node has resources to be deleted for the requested flow<br>Bit 1: 0<br>Bit 0: INTERPRETED - '1' |
| RESERVED | 8 bits | Type III |
| WAVE_SEQ_N | 8 bits | Copied from initiating REQUEST |
| RESERVED | 32 bits | Type III |
| Response L2ME Payload for Delete (Wave 0) | | |
| RESERVED | 32 bits | 0x0; Type III |

During the second wave 1312, Wave 1, the flow resources are deleted. NC node 1306 initiates the second wave 1312 using an Request message format with the concatenated responses from the first wave 1310. One example of a Response message format used in the second wave 1312. Wave 1, is shown in Table 18 below. Each node 1304, 1308 responds with a Response Frame in the second wave 1312, indicating flow deletion by setting bit 31 in the DELETED field in the payload portion of the Frame.

TABLE 18

Response L2ME Payload for Delete (Wave 1)

| Field | Length | Usage |
|---|---|---|
| Response L2ME Header for Delete (Wave 1) | | |
| HDR_FMT | 8 bits | |
| RESP_STATUS | 8 bits | Bits 7:4 - reserved Type III<br>Bit 3: DO_ENTRY_CANCEL - '0'<br>Bit 2: IN_NEXT_WAVE -<br>Bit 1: 0<br>Bit 0: INTERPRETED - '1' |
| RESERVED | 8 bits | Type III as defined in ref. [1] |
| WAVE_SEQ_N | 8 bits | Copied from initiating REQUEST |
| RESERVED | 32 bits | Type III as defined in ref. [1] |
| Response L2ME Payload Delete (Wave 1) | | |
| DELETED | 32 bit | Bit 31 - 1 if resources were deleted for the specified flow<br>Bits 30:0 - reserved Type III |

In the third wave 1314, Wave 2, NC node 1306 informs EN 1304 that the requested flow was deleted. The third wave 1314 is initiated by NC node 1306 using a Request message format with the concatenated responses from the second wave 1312. The Delete transaction 1300 is completed when EN 1304 and any other requested nodes 1308 provide their final Response as shown in Table 19 below.

TABLE 19

Response L2ME Header and Payload Format (Wave 2)

| Field | Length | Usage |
|---|---|---|
| Response L2ME Header for Delete (Wave 2) | | |
| HDR_FMT | 8 bits | |
| RESP_STATUS | 8 bits | Ignored by receiving node |
| RESERVED | 8 bits | Type III |

TABLE 19-continued

Response L2ME Header and Payload Format (Wave 2)

| Field | Length | Usage |
|---|---|---|
| WAVE_SEQ_N | 8 bits | Copied from initiating REQUEST |
| RESERVED | 32 bits | Type III |
| Response L2ME Payload for Delete (Wave 2) | | |
| RESERVED | 32 bit | Type III |

Maintenance Parameterized QoS Flow Transaction

Figure 14:
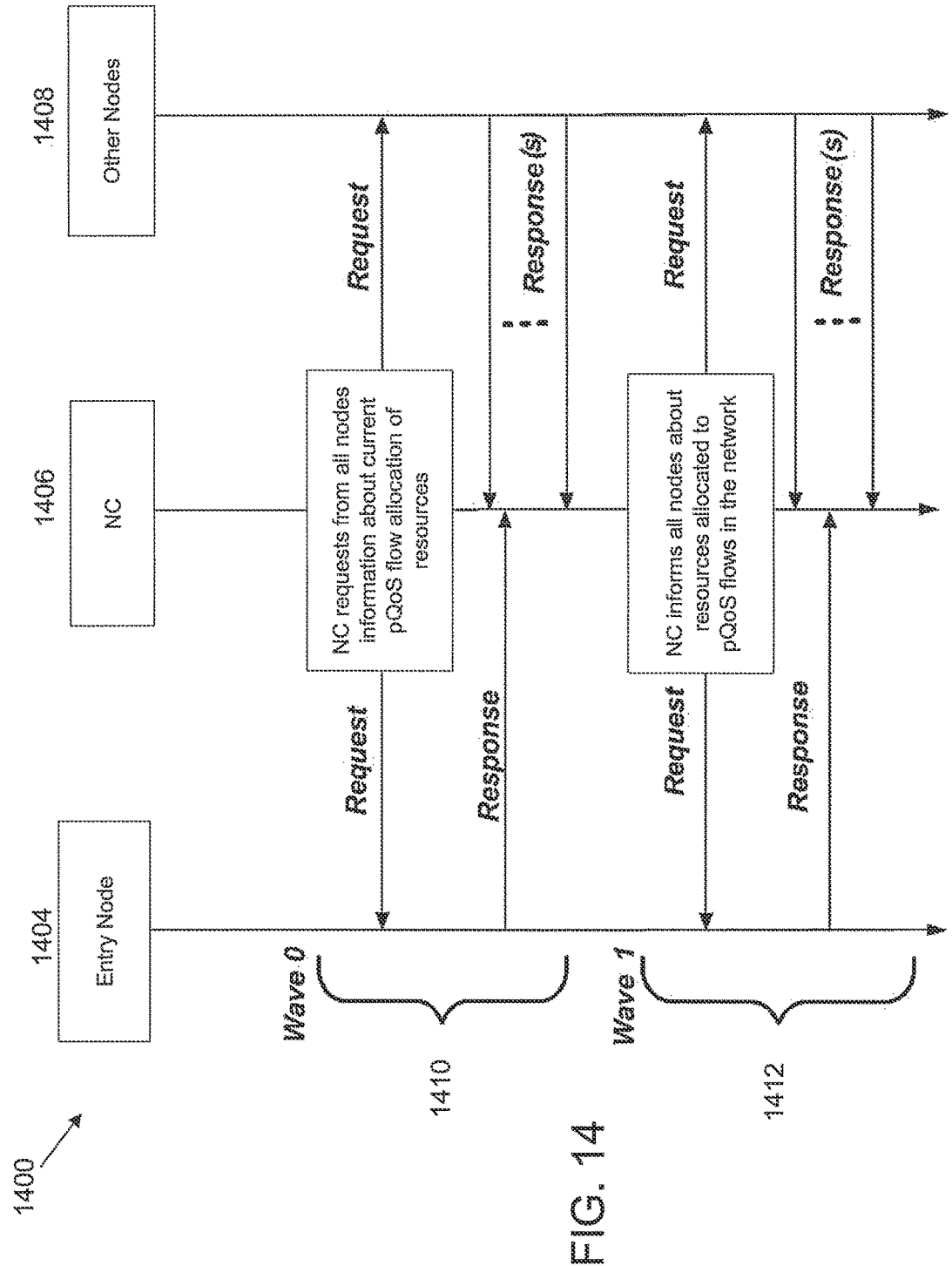
FIG. 14 is a diagram showing one example of a Maintenance transaction in accordance with the embodiment of FIG. 5.

The Maintenance pQoS transaction may be used to periodically assess if there are sufficient network resources for the committed pQoS flows. With reference to FIG. 14, one example of a Maintenance pQoS transaction 1400 in accordance with the embodiment shown in FIG. 5 is now described. In one embodiment, Maintenance pQoS transaction 1400 may be accomplished by the NC node 140 issuing this transaction between T22 (T6/5) to T6 seconds where T6 may be 25 or 50 seconds. Additionally, the NC node 1406 may issue this transaction, T22 (T6/5) seconds after a new L2ME pQoS-enabled node joins the network 502. The Maintenance transaction 1400 comprises two L2ME Waves 1410, 1412 and a Submit message is not required since the transaction is triggered by the NC node 1406.

NC node 1406 initiates the first wave 1410, Wave 0, and the Maintenance transaction 1400 by transmitting a Request message, one example of which is shown in Table 20 below. The Request message asks all the nodes 1404, 1408 to provide information about their current flow allocation metrics.

TABLE 20

Request L2ME Frame Format for Maintenance (Wave 0)

| Field | Length | Usage |
|---|---|---|
| Request L2ME Header for Maintenance | | |
| HDR_FMT | 8 bits | |
| ENTRY_NODE_ID | 8 bits | 0xFF |
| ENTRY_INDEX | 8 bits | |
| RESERVED | 8 bits | 0; Type III |
| VENDOR_ID | 8 bits | 0 |
| TRANS_TYPE | 8 bits | 1=PQOS |
| TRANS_SUBTYPE | 8 bits | 6: Maintenance |
| WAVE_NODEMASK | 32 bits | All nodes |
| CYCLE_NODEMASK | 32 bits | |
| WAVE_STATUS | 8 bits | 0x0 |
| DIR_LEN | 8 bits | Ignore |
| TXN_SEQ_N | 8 bits | |
| TXN_WAVE_N | 8 bits | 0 |
| L2ME Payload for Maintenance | | |
| RESERVED | 32 bits | 0x0; Type III |

Each requested node 1404, 1408 sends its Response message with the payload format as shown in Table 21 for the first wave 1410, specifying the EXISTING_TPS and EXISTING_PPS values for all the existing flows in which the node is an ingress node.

TABLE 21

Response L2ME Payload Format for Maintenance (Wave 0)

| Field | Length | Usage |
|---|---|---|
| Response L2ME Header for Maintenance | | |
| HDR_FMT | 8 bits | |
| RESP_STATUS | 8 bits | Bits 7:4 - reserved Type III |
| | | Bit 3: DO_ENTRY_CANCEL - '0' |
| | | Bit 2: IN_NEXT_WAVE - |
| | | Bit 1: 0 |
| | | Bit 0: INTERPRETED - '1' |
| RESERVED | 8 bits | Type III |
| WAVE_SEQ_N | 8 bits | Copied from initiating Request |
| RESERVED | 32 bits | Type III |
| Request L2ME Payload for Maintenance | | |
| EXISTING_TPS | 32 bits | SLOT_TIME/second of all the existing flows for which the node is ingress node |
| EXISTING_PPS | 32 bits | packets/second of all the existing flows for which the node is ingress node |
| RESERVED | 32 bits | 0x0; Type III |
| RESERVED | 32 bits | 0x0: Type III |

The second wave 1412, Wave 1, enables NC node 1406 to find out if the current pQoS flows in the network are guaranteed in view of changing network conditions based on the results of the first wave 1410. The NC node 1406 initiates the second wave 1112 using a Request message format header shown in Table 22 with the following changes:

1. WAVE_STATUS=1
2. DIR_LEN=0×10
3. TXN_WAVE_N=1

If the aggregate of all the pQoS flows are over-committed, then NC node 1406 sets the OVER_COMMITTED field value to "1" in the Request message of the second wave 1412. Each node 1404, 1408 may send a message to its application layer notifying it that the network's pQoS flow resources are not guaranteed.

TABLE 22

Request L2ME Payload Message Format for Maintenance (Wave 1)

| Field | Length | Description |
|---|---|---|
| OVER_COMMITTED | 32 bits | Set to '1' if pQoS flows are over committed; otherwise '0' |
| RESERVED | 32 bits | 0x0; Type III |
| RESERVED | 32 bits | 0x0; Type III |

The Maintenance transaction 1400 is completed when each node 1404, 1408 sends its Response Frame to NC node 1406 as shown in Table 23 below.

TABLE 23

Response L2ME Message Format for Maintenance (Wave 1)

| Field | Length | Usage |
|---|---|---|
| Response L2ME Header for Maintenance (Wave 1) | | |
| HDR_FMT | 8 bits | |
| RESP_STATUS | 8 bits | Ignored by receiving node |
| RESERVED | 8 bits | Type III |

TABLE 23-continued

Response L2ME Message Format for Maintenance (Wave 1)

| Field | Length | Usage |
|---|---|---|
| WAVE_SEQ_N | 8 bits | Copied from initiating REQUEST |
| RESERVED | 32 bits | Type III |
| Response L2ME Payload for Maintenance | | |
| RESERVED | 32 bits | 0x0: Type III |

Event Mechanism

The Event Mechanism may be implemented in hardware or software and is used to spontaneously indicate changes in the network to the QoS Manager 520 through the QoS Device Service 518. Events may be triggered for a variety of reasons including, but not limited to, the addition or loss of a network node, an increase or decrease in network bandwidth, or a change in the path of a parameterized network flow.

In one embodiment, all network events may be global in nature such that NC node 506 is aware of each and every network event. In this embodiment, only the NC node 506 and the EN 504 are needed to report a network event.

In some embodiments, the events are not global and thus messaging is used to inform the nodes of changes in the network. If the Event Mechanism is implemented in software and the network does not include a proxy, the Event Mechanism may be implemented as an unsolicited bottom-up message or as a response to periodic polling by the QoS Device Service 518. The polling interval may be set at 1 second or another predetermined time interval. In one embodiment including a proxy, the Event Mechanism may be implemented as an unsolicited Layer 2 message to the proxy, or as a response message to periodic polling by the proxy.

In order to simplify the implementation, all events may be aggregated together into a single message with each event represented by a flag. The aggregated event flag is generated by a node having a QoS Device Service or an L2ME Aggregation Entity each time there is a change in the path of a network flow. Upon receiving an event message, the receiver may use polling to determine the actual event if desired. However, UPnP does not use such an aggregation, and in this embodiment aggregation is done only between Layer 2 and the QoS Device Service 518. The QoS Device Service 518 will de-aggregate the message for UPnP compliance. Note that the de-aggregation may not be necessary for a non-UPnP system implementation.

An Event may also be triggered each time a parameterized QoS flow is setup or torn down in a network. When a flow is setup, the Setup Flow Counter is incremented and an Event is generated. Alternatively, each time a parameterized QoS flow is released from a network, the Release Flow Counter is incremented triggering an Event. Once an Event is generated, an unsolicited response message may be transmitted.

A Path Information Event is generated by a node each time there is a change in path information. For example, if the path of a parameterized flow changes, e.g., a node is dropped or added from the transmit path, then the node would send an Event message to the QoS Device Service or L2ME Aggregation Entity. The message may be implemented as an unsolicited response message or as a response to being polled by the QoS Device Service or L2ME Aggregation Entity.

A Most Recent Stream. Action Event occurs each time a flow is setup or torn down in the network. If a parameterized QoS flow is setup in the network, then the Setup Flow Counter in a node is incremented and an Event message is generated. Similarly, if a parameterized QoS flow is torn down in the network, then a Release Flow Counter in a node is incremented and an Event message is generated.

An Interface Capability Event is a particular event which occurs when a non-parameterized QoS capable node joins a parameterized QoS capable network. When this Event occurs, each existing parameterized QoS cable node may automatically down-grade to non-parameterized QoS and support only prioritized and best effort QoS. The existing nodes each inform their QoS Device Service or L2ME Aggregation Entity of the change by generating an event and either sending the message as an unsolicited response or transmitting the event message in response to polling from the parameterized QoS Device Service or L2ME Aggregation Entity. The QoS Device Service or L2ME Aggregation Entity may determine What the Event is by comparing the values of the node's current Native Quality of Service, Admission Control Supported, and Segment ID fields with the previous values.

A Flow Error Event is generated when an admitted parameterized QoS flow can no longer be supported in the network. For example, if the network bandwidth is reduced due to a change in the network topology, e.g., a node is removed, then a Flow Error Event is generated.

A Parameterized Bandwidth Exceeded Event is triggered when the parameterized bandwidth is exceeded. If the parameterized bandwidth is exceeded and the event is triggered, then it is possible that some of the admitted parameterized QoS flows are no longer properly transmitting. Accordingly, the parameterized bandwidth exceeded Event generates a message which is sent as an unsolicited response or as response to polling.

The Segment ID Changed Event is generated when the segment ID changes. A change in the segment ID may occur if the NC of the network changes in the case where the pQoS segment ID is related to the MAC address of the NC, or if the frequency channel number on which the network operates changes in the case where the pQoS segment ID is related to the frequency channel number.

In addition to the above described embodiments, the disclosed method, system, and apparatus may be embodied in the form of computer-implemented processes and apparatus for practicing those processes. The present disclosed method, system, and apparatus may also be embodied in the form of computer program code embodied in tangible media, such as floppy diskettes, read only memories (ROMs), CD-ROMs, hard drives, "ZIP™" high density disk drives, DVD-ROMs, flash memory drives, or any other computer-readable storage medium, wherein, when the computer program code is loaded into and executed by a computer, the computer becomes an apparatus for practicing the disclosed method and system. The present disclosed method, system, and apparatus may also be embodied in the form of computer program code, for example, whether stored in a storage medium, loaded into and/or executed by a computer, wherein, when the computer program code is loaded into and executed by a computer, the computer becomes an apparatus for practicing the disclosed method, system, and apparatus. When implemented on a general-purpose processor, the computer program code segments configure the processor to create specific logic circuits.

Although the disclosed method and system have been described in terms of embodiments, it is not limited thereto. Rather, the appended claims should be construed broadly, to include other variants and embodiments of the disclosed method and system, which may be made by those skilled in the art without departing from the scope and range of equivalents of the disclosed method and system.

What is claimed is:

1. A network coordinator device in a home communication network, comprising:
   a processor; and
   a memory in communication with the processor and storing instructions that, when read by the processor, cause the network coordinator device to operate a Multimedia over Coax Alliance (MoCA) network to:
   receive, from a first node in the home communication network, a first request for communication bandwidth in the home communication network, wherein the first request comprises a quality of service guarantee;
   make a prescribed bandwidth available in the home communication network according to the first request;
   allocate a first portion of the prescribed bandwidth and a first time slot for the first request, and transmit first data in accordance with the first request by using the first portion in the prescribed bandwidth, the first data transmitted with the quality of service guarantee of the first request;
   receive, from a second node in the home communication network, a second request for communication bandwidth in the home communication network; and
   in response to determining the first portion of the prescribed bandwidth being less than the entirety of the prescribed bandwidth, allocate a second portion of the prescribed bandwidth to the second request, and transmit second data according to the second request by using the second portion of the prescribed bandwidth, the second data transmitted without a quality of service guarantee;
   wherein the instructions, when read by the processor, further cause the network coordinator device to:
   send a first message to each node in the home communication network to ask for information about current flow allocation metrics;
   in response to receiving a response message from each node, determine whether network resources of the home communication network are over-committed for current committed flows in view of changing networking conditions based on the response message from each node; and
   in response to determining that network resources of the home communication network are over-committed for current committed flows, send a second message to each node to indicate that the network resources have not been guaranteed,
   wherein each node is configured to, in response to receiving the second message, send a third message to an application layer of each node notifying that the network resources have not been guaranteed.

2. The network coordinator device of claim 1, wherein:
   the first request indicates a first quality of service metric; and
   the second request indicates a second quality of service metric different from the first quality of service metric.

3. The network coordinator device of claim 2, wherein the first request indicates a latency metric.

4. The network coordinator device of claim 1, wherein the instructions, when read by the processor, cause the network coordinator device to transmit a message indicating the first portion of the prescribed bandwidth and the first time slot allocated to the first node.

5. The network coordinator device of claim 1, wherein the instructions, when read by the processor, cause the network coordinator device to transmit a message indicating the first portion of the prescribed bandwidth and the first time slot allocated to the first node and the second portion of the prescribed bandwidth and the second time slot allocated to the second node.

6. The network coordinator device of claim 1, wherein the instructions, when read by the processor, cause the network coordinator device to:
   receive a third request from a third node in the home communication network; determine the home communication network has insufficient bandwidth to satisfy the third request; and
   deny the third request.

7. The network coordinator device of claim 6, wherein the instructions, when read by the processor, cause the network coordinator device to transmit a response to the third node, the response indicating the third request was denied.

8. The network coordinator device of claim 1, wherein:
   the first node comprises an ingress node of the home communication network; and
   the second node comprises an egress node of the home communication network.

9. The network coordinator device of claim 1, wherein the home communication network comprises a network segment within a communication network having a plurality of network segments.

10. The network coordinator device of claim 9, wherein:
    the home communication network comprises a coaxial network; and
    each of the plurality of network segments in the communication network shares a PHY layer and a MAC layer.

11. The network coordinator device of claim 1, wherein the instructions, when read by the processor, further cause the network coordinator device to:
    send the first message to each node through a first transaction wave; and
    send the second message to each node through a second transaction wave, wherein the second transaction wave is different from the first transaction wave.

12. A computer-implemented method, comprising:
    receiving, from a first node in a home communication network operating according to a Multimedia over Coax Alliance (MoCA) standard, a first request for communication bandwidth in the home communication network, wherein the first request comprises a quality of service guarantee;
    making a prescribed bandwidth available in the home communication network according to the first request;
    allocating a first portion of the prescribed bandwidth and a first time slot for the first request, and transmitting first data in accordance with the first request by using the first portion of the prescribed bandwidth, the first data transmitted with the quality of service guarantee in the first request;
    receiving, from a second node in the home communication network, a second request for communication bandwidth in the home communication network; and
    in response to determining the first portion of the prescribed bandwidth being less than the entirety of the prescribed bandwidth, allocating a second portion of the prescribed bandwidth to the second request, and transmit second data according to the second request by using the second portion of the prescribed bandwidth, the second data transmitted without a quality of service guarantee;

wherein the method further comprises:

sending a first message to each node in the home communication network to ask for information about current flow allocation metrics;

in response to receiving a response message from each node, determining whether network resources of the home communication network are over-committed for current committed flows in view of changing networking conditions based on the response message from each node; and in response to determining that network resources of the home communication network are over-committed for current committed flows, sending a second message to each node to indicate that the network resources have not been guaranteed, wherein each node is configured to, in response to receiving the second message, send a third message to an application layer of each node notifying that the network resources have not been guaranteed.

13. The computer-implemented method of claim 12, wherein: the first request indicates a first quality of service metric; and the second request indicates a second quality of service metric different from the first quality of service metric.

14. The computer-implemented method of claim 13, wherein the first request indicates a latency metric.

15. The computer-implemented method of claim 12, comprising transmitting a message indicating the first portion of the prescribed bandwidth and the first time slot allocated to the first node.

16. The computer-implemented method of claim 12, comprising transmitting a message indicating the first portion of the prescribed bandwidth and the first time slot allocated to the first node and the second portion of the prescribed bandwidth and the second time slot allocated to the second node.

17. The computer-implemented method of claim 12, comprising: receiving a third request from a third node in the home communication network; determining the home communication network has insufficient bandwidth to satisfy the third request; and denying the third request.

18. The computer-implemented method of claim 17, comprising transmitting a response to the third node, the response indicating the third request was denied.

19. The computer-implemented method of claim 12, wherein: the first node comprises an ingress node of the home communication network; and the second node comprises an egress node of the home communication network.

20. The computer-implemented method of claim 12, wherein the home communication network comprises a network segment within a communication network having a plurality of network segments.

21. The computer-implemented method of claim 20, wherein:

the home communication network comprises a coaxial network; and each of the plurality of network segments in the communication network shares a PHY layer and a MAC layer.

* * * * *